(12) United States Patent
Spark

(10) Patent No.: US 11,148,831 B2
(45) Date of Patent: Oct. 19, 2021

(54) SYSTEMS AND METHODS FOR SATELLITE SOLAR PANEL DEPLOYMENT

(71) Applicant: Spire Global, Inc., San Francisco, CA (US)

(72) Inventor: William Joel Spark, Calgary (CA)

(73) Assignee: SPIRE GLOBAL, INC., San Francisco, CA (US)

(*) Notice: Subject to any disclaimer, the term of this patent is extended or adjusted under 35 U.S.C. 154(b) by 490 days.

(21) Appl. No.: 15/809,219

(22) Filed: Nov. 10, 2017

(65) Prior Publication Data

US 2019/0144137 A1 May 16, 2019

(51) Int. Cl.
*B64G 1/22* (2006.01)
*B64G 1/44* (2006.01)

(52) U.S. Cl.
CPC ............. *B64G 1/222* (2013.01); *B64G 1/443* (2013.01)

(58) Field of Classification Search
CPC .......... B64G 1/44; B64G 1/443; B64G 1/446; B64G 1/222
See application file for complete search history.

(56) References Cited

U.S. PATENT DOCUMENTS

| | | | |
|---|---|---|---|
| 3,326,497 A * | 6/1967 | Michelson | B64G 1/443 244/172.7 |
| 4,561,614 A | 12/1985 | Olikara et al. | |
| 4,988,060 A | 1/1991 | Janson et al. | |
| 5,265,853 A | 11/1993 | Szirtes | |
| 5,319,905 A | 6/1994 | Szirtes | |
| 5,785,280 A * | 7/1998 | Baghdasarian | B64G 1/222 136/245 |
| 5,785,290 A | 7/1998 | Baghdasarian | |
| 5,810,296 A | 9/1998 | Izumi | |
| 5,909,860 A | 6/1999 | Lee | |
| 7,708,228 B2 * | 5/2010 | Chaix | B64G 1/222 244/172.6 |
| 8,757,554 B1 | 6/2014 | Harvey et al. | |
| 9,446,864 B2 | 9/2016 | Orias et al. | |
| 9,546,008 B1 | 1/2017 | Santos Soto et al. | |
| 9,761,401 B1 * | 9/2017 | Vega | H01H 85/06 |
| 2005/0156083 A1 * | 7/2005 | Chaix | B64G 1/222 455/12.1 |
| 2012/0024342 A1 | 2/2012 | Kalman | |
| 2014/0151485 A1 * | 6/2014 | Baudasse | B64G 1/222 242/375 |
| 2015/0102172 A1 | 4/2015 | Thurn | |
| 2016/0251092 A1 | 9/2016 | Cappaert et al. | |

* cited by examiner

*Primary Examiner* — Magdalena Topolski
*Assistant Examiner* — Marisa V Conlon
(74) *Attorney, Agent, or Firm* — Troutman Pepper Hamilton Sanders LLP

(57) ABSTRACT

The disclosed technology includes systems, methods, and mechanism configurations related to satellite solar panels, including stowing arrangements, deployment sequences, special purpose hinges, hold down and release mechanisms, and associated components for controlled deployment of the satellite solar panels.

18 Claims, 16 Drawing Sheets

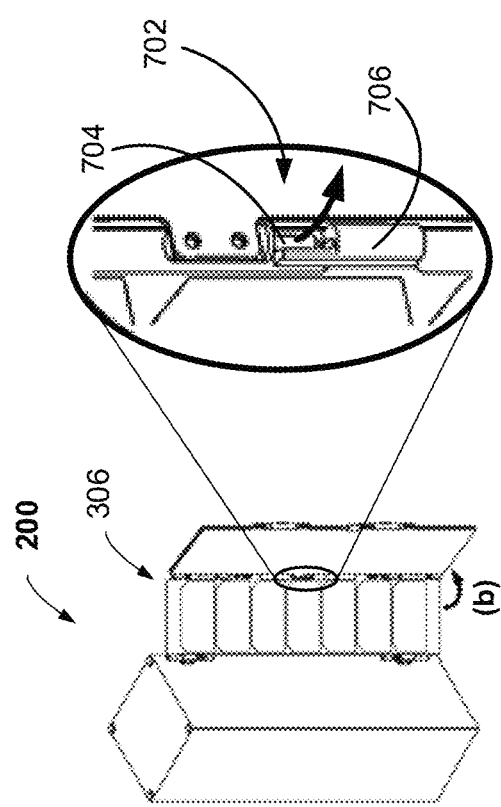
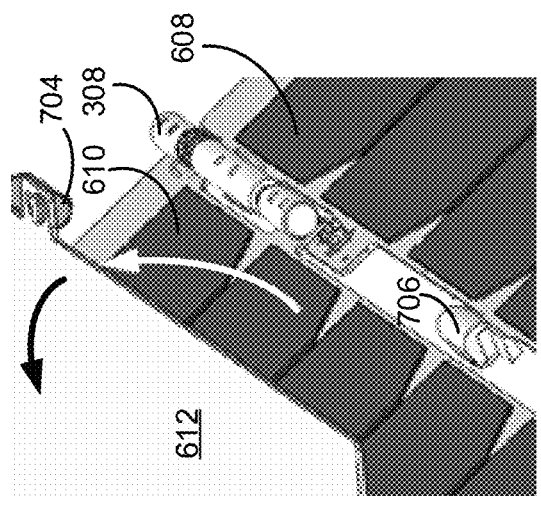
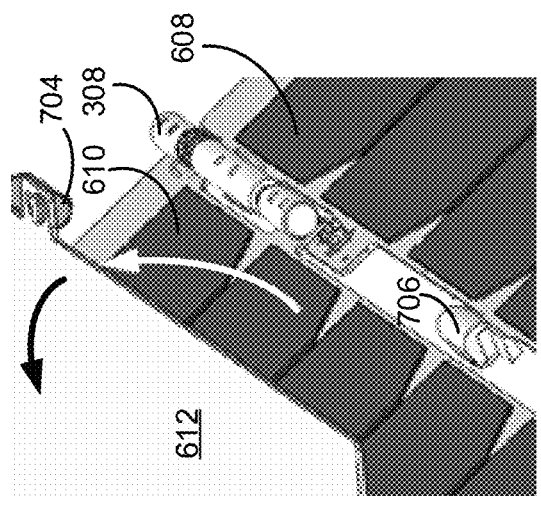
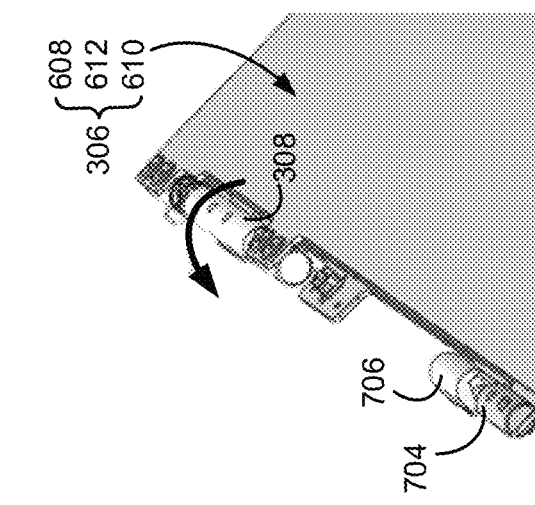

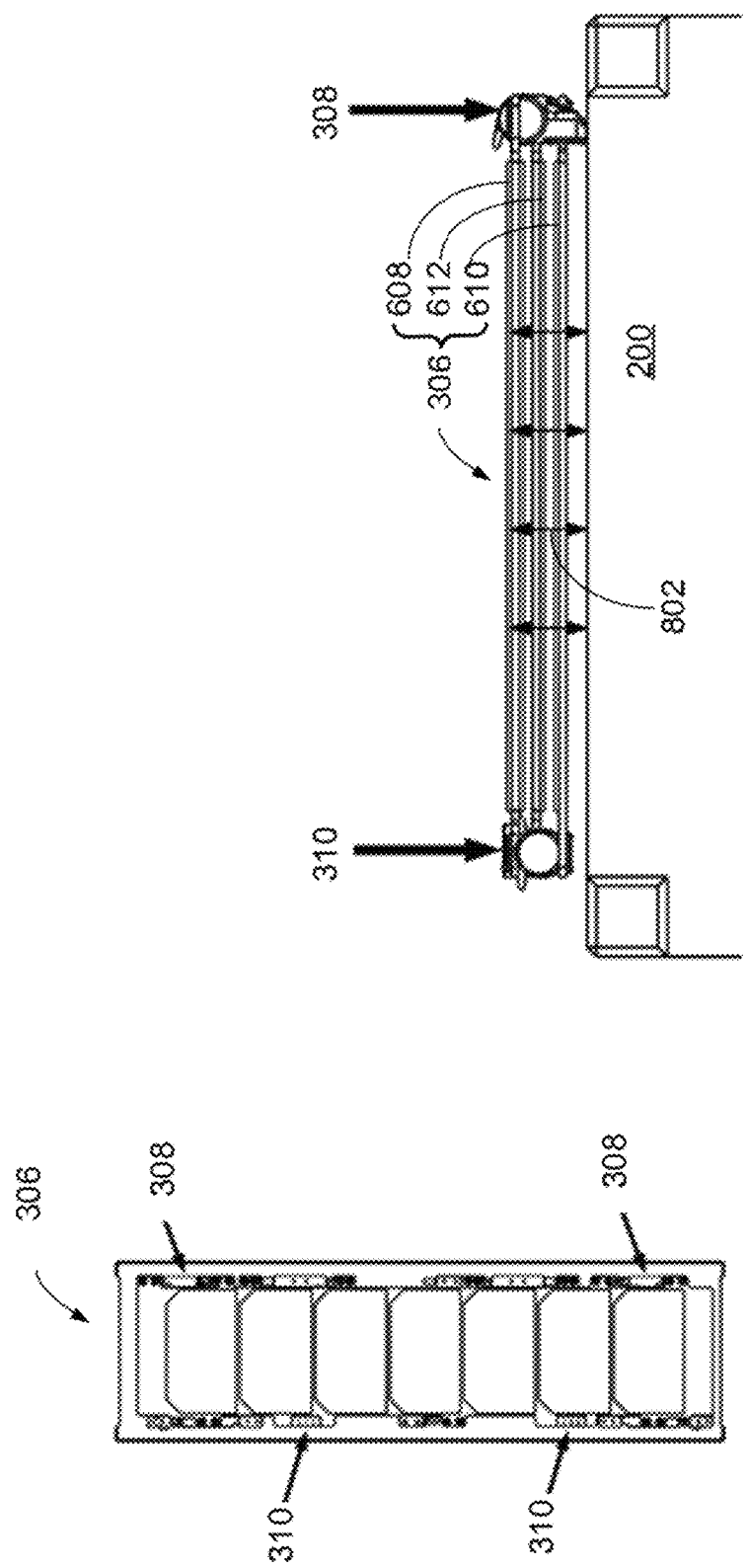

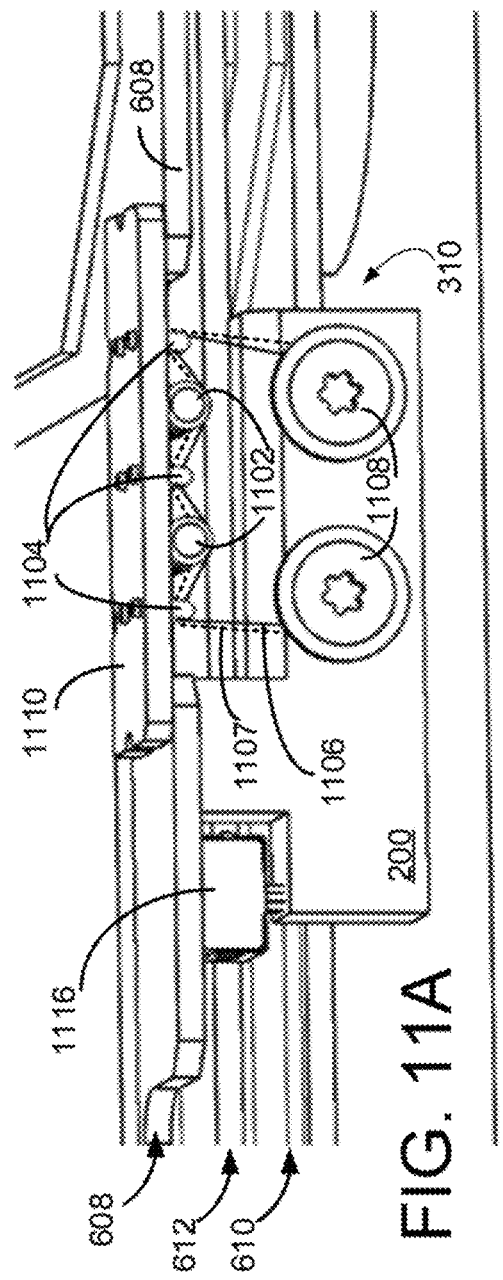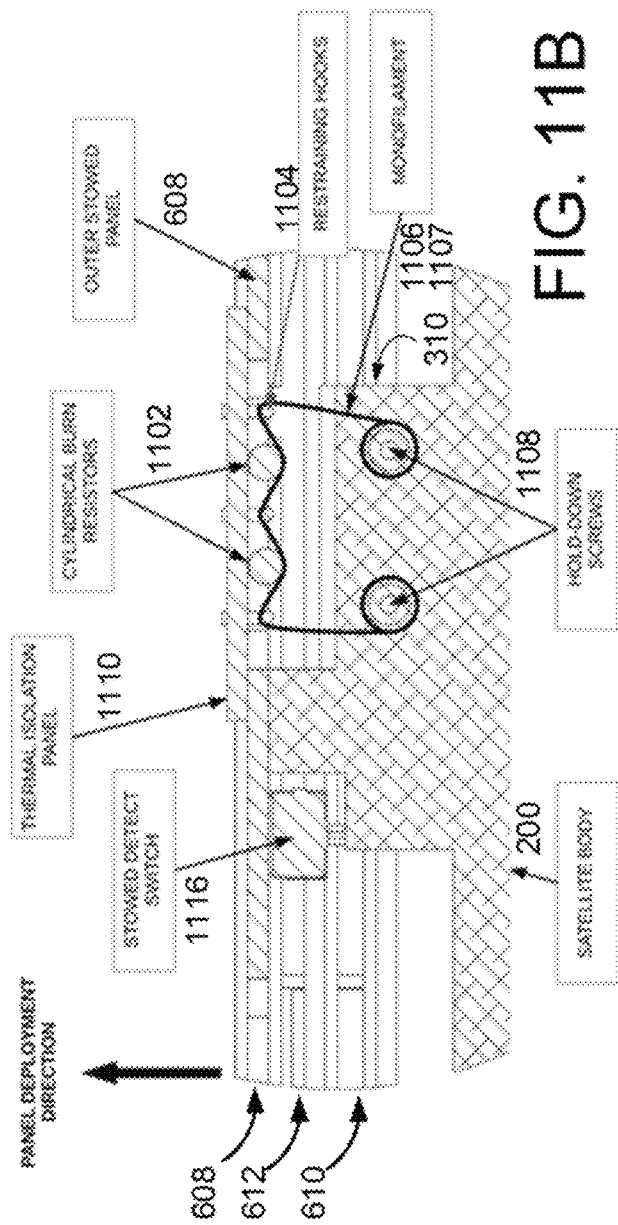

SYSTEMS AND METHODS FOR SATELLITE SOLAR PANEL DEPLOYMENT

FIELD

The disclosed technology relates to satellite solar panel deployment. In particular, the disclosed technology includes systems, methods, and mechanism configurations related to satellite solar panels, including hinges, hold down and release mechanisms, and associated components utilized for stowing and controlled deployment of the satellite solar panels.

BACKGROUND

Nearly all satellites utilize solar panel systems to harvest electricity for powering on-board systems, charging batteries, etc. The utilization of solar energy in satellites often requires a tradeoff between maximizing size of the solar panels and minimizing valuable launch vehicle real estate. For example, when a satellite is prepared to be launched into orbit via a spacecraft, the associated solar panel equipment may be secured in a retracted position to conserve space and to avoid damage to the equipment or the deployer, and to mitigate the chances of orbital debris caused by deployment. Once the satellite is in orbit, the solar panels are unfolded and deployed to an operative position.

FIG. 1 depicts a top-view example representation of a prior art satellite 102 with an "accordion"-style solar panel array 104 arrangement in stowed (A), unfolding (B), and deployed (C) positions. In such systems, the array 104 solar panels are pivotally coupled end-to-end, folded accordion style for stowage (A), and secured with tie-down/release mechanisms 106, 108 along both edges of the array and/or at a central portion of the panels. Once the satellite is in orbit, the restraining mechanisms are released to allow the array 104 to unfold into a substantially planar (or linear) configuration to receive photons from the sun.

In many prior art systems, the array 104 is attached at a midpoint 110 on the body of the satellite 102. In such systems, a half-width panel 112 may be utilized to allow for folding the array 104 against one side of the satellite 102 during stowage (A), but such an arrangement may leave a portion of unused volume 114 between the folded array 104 and the body of the satellite 102. Furthermore, the use of a reduced size panel 112 (due to the mid-point attachment 110) may reduce the effective size (and power harvesting potential) of the unfolded array 104.

One of the drawbacks with accordion-style arrangements and/or attachment points of the conventional system is that the edges of the stowed panel 104 typically need to be secured on both respective sides (and/or the center) of the satellite body by the tie-down/release mechanisms 106, 108, which can create extra bulk. In such prior art systems, the chances for a deployment fault can be increased due to the added coordination needed for releasing both tie-down/release mechanisms 106, 108. In some systems, one or more of the tie-down/release mechanisms 106, 108 may become detached during deployment, and may create additional orbital debris and/or may damage the panel 104 or satellite 102.

A need exists for improved systems and methods to address such challenges.

BRIEF SUMMARY

Some or all the above needs may be addressed by certain embodiments and implementations disclosed herein.

Certain implementations of the disclosed technology may include a system that includes a satellite body. The satellite body may define: first, second, third, and fourth major sides; with first, second, third and fourth edge regions disposed between the corresponding first and second, second and third, third and fourth, and fourth and first major sides. The system includes a first solar array having a plurality of panels attached to one another therebetween by corresponding first-type hinge mechanisms. A first panel of the plurality of panels is attached to the satellite body at the first edge region by one or more second-type hinge mechanisms, and at least the first panel of the plurality of panels is releasably constrained by a hold down and release mechanism (HDRM). The first solar array is configured to be foldable into a stowed configuration, and (planar) unrollable into a deployed configuration.

Certain implementations of the disclosed technology may include a method of planar rolling, into a stowed configuration for stowage against a first major side of a satellite body, a plurality of solar panels, the plurality of solar panels may be attached to one another therebetween by corresponding first-type hinge mechanisms. The method includes attaching, by one or more second-type hinge mechanisms, and at or near a first edge region of the satellite body, a first panel of the plurality of solar panels, and releasably constraining, by a hold down and release mechanism (HDRM), the planar rolled plurality of solar panels at an edge region adjacent to the first edge region. The (planar) "rolled" plurality of solar panels is configured to be released by the HDRM and (planar) "unrolled" into a deployed linear array configuration having an innermost panel, a middle panel, and an outermost panel, and the outermost panel of the deployed linear array is disposed between an innermost panel and a middle panel of the plurality of panels in the stowed configuration.

Certain implementations of the disclosed technology may include another method of deploying, from a stowed position against a first major side of a satellite body, a plurality of solar panels having a deployable innermost, middle, and outermost panel. The deployable outermost panel of the plurality of solar panels is disposed in a first stacked configuration between the deployable innermost panel and the deployable middle panel during the stowed position. The plurality of solar panels may be configured to be rotatably attached to one another therebetween by corresponding first-type hinge mechanisms, and the deployable innermost panel of the plurality of solar panels is configured to attach to the satellite body at or near a first edge region by one or more second-type hinge mechanisms. A hold down and release mechanism (HDRM) disposed at a second edge region of the satellite body is configured to constrain and selectively release the plurality of solar panels from the stowed position. The method of deploying can include: releasing from the stowed position, and by the HDRM, a first constrained portion of the plurality of solar panels; rotating the released portion of the plurality of solar panels to a first predetermined angle with respect to the first major side of the satellite body while maintaining the first stacked configuration; releasing, at the first predetermined angle, and by a first cam and a first stop mechanism, a second constrained end of the deployable middle and outermost panel; rotating the released portion of the deployable middle and outermost panel to a second predetermined angle with respect to the deployable innermost panel while maintaining a second stacked configuration of the deployable middle panel and deployable outermost panel; and releasing, at the second predetermined angle, and by a second cam and a second stop mechanism, a third constrained end of the deployable outermost panel.

Certain implementations of the disclosed technology may include hinge assembly configured to rotatingly join an inboard panel with an outboard panel of a deployable satellite solar array. The hinge assembly includes: a first rotor having a pin portion, a rotor endstop portion, and a first rotor body portion. The first rotor body portion is configured to attach to the outboard panel. The hinge assembly includes a first bushing having an inner surface configured to rotatingly engage with an outer surface of the pin portion of the first rotor. The hinge assembly includes a stator having a first bore, a stator endstop portion, a stator body portion, and a second bore. An inner surface of the first bore is configured to engage with an outer surface of the first bushing, and the stator endstop portion is configured to restrict a relative rotation between the inboard and outboard panel when engaged with the rotor endstop portion. The stator body portion is configured to attach to the inboard panel. The hinge assembly includes a second bushing having an outer surface configured to engage with an inner surface of the second bore of the stator. The hinge assembly includes second rotor having a second rotor pin portion, a spring retention portion and a second rotor body portion. An outer surface of the second rotor pin portion is configured to rotatingly engage with an inner surface of the second bushing, and the second rotor body portion is configured to attach to the outboard panel. The hinge assembly includes a spring having a coiled portion, a first spring end, and a second spring end. The coiled portion is configured to surround the spring retention portion of the second rotor, the first spring end is configured to engage with the stator, and the second spring end is configured to engage with the second rotor.

Certain implementations of the disclosed technology may include hold down and release mechanism (HDRM) configured to secure and selectively release one or more panels of a deployable satellite solar array. The HDRM can include: a circuit board electrically coupled to an activation circuit; at least two cylindrical burn resistors electrically coupled to the circuit board; a burn wire (such as monofilament) in contact with the at least two cylindrical burn resistors; and two or more restraining hooks configured to retain the burn wire against the at least two cylindrical burn resistors. The activation circuit is configured to selectively direct current through the at least two cylindrical burn resistors to sever the burn wire.

Certain implementations of the disclosed technology may include method of deploying a satellite solar array. The method can include: securing one or more panels of the satellite solar array against a body of the satellite with a burn wire; selectively energizing, with an activation circuit, at least two cylindrical burn resistors in a contact with the burn wire; severing the burn wire by the selectively energizing; releasing by the severing, at least the secured end of the one or more panels the satellite solar array; and planar unrolling the satellite solar array into a deployed configuration.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 7A depicts the satellite 200 in an unfolding stage (as depicted in the corresponding second unfolding stage (b) of FIGS. 4A and 4B) in which the cam 704 remains constrained by the stop 706.

FIG. 7B depicts the panels 608, 610, 612 during a first stage of unfolding (such as described above and as depicted in FIG. 6A or FIG. 6C), according to an example implementation of the disclosed technology.

FIG. 7C depicts the panels 608, 610, 612 near a second stage of rotation, i.e. right before the second predetermined angle of rotation has been exceeded.

FIG. 7D depicts the panels 608, 610, 612 in a final-deployment stage in which the innermost panel 608 has rotated past the first predetermined rotation angle, and where the middle panel 610 and outermost panel 612 have rotated past the second predetermined rotation angle, allowing the cam 704 to clear the stop 406, thereby allowing the outermost panel 612 to swing clear of the innermost panel 608 and the body of the satellite 200.

FIG. 8A is a side face view illustration of a planar rolled-up solar array 306, according to an example implementation of the disclosed technology.

FIG. 8B is a side edge view illustration of the rolled-up array 306 in a stowed configuration.

FIG. 11A is a side-view perspective illustration of a hold down and release mechanism (HDRM) 310 (as also depicted in FIGS. 3A, 3B, 8A, and 8B) according to an example implementation of the disclosed technology.

FIG. 11B is a cross sectional side-view illustration of the HDRM 310, with like components as depicted in FIG. 11A.

DETAILED DESCRIPTION

Some implementations of the disclosed technology will be described more fully hereinafter with reference to the accompanying drawings. This disclosed technology may however, be embodied in many different forms and should not be construed as limited to the implementations set forth herein. Some of the components illustrated in the accompanying figures are shown for illustration purposes only, and may or may not be drawn to scale. In the following detailed description, numerous specific details are set forth by way of examples to provide a thorough understanding of the relevant teachings. However, it should be apparent to those skilled in the art that the present teachings may be practiced without such details. In other instances, well known methods, procedures, components, and/or circuitry have been described at a relatively high-level, without detail, to avoid unnecessarily obscuring aspects of the present teachings.

As used herein, the terms planar "rollable," "rolling," "rolled," and/or "unrollable," "unrolling," "unrolled" (or equivalents) may include any structure or associated action in which a structure is sequentially folded and/or unfolded in sections in a manner similar to rolling.

Figure 2:
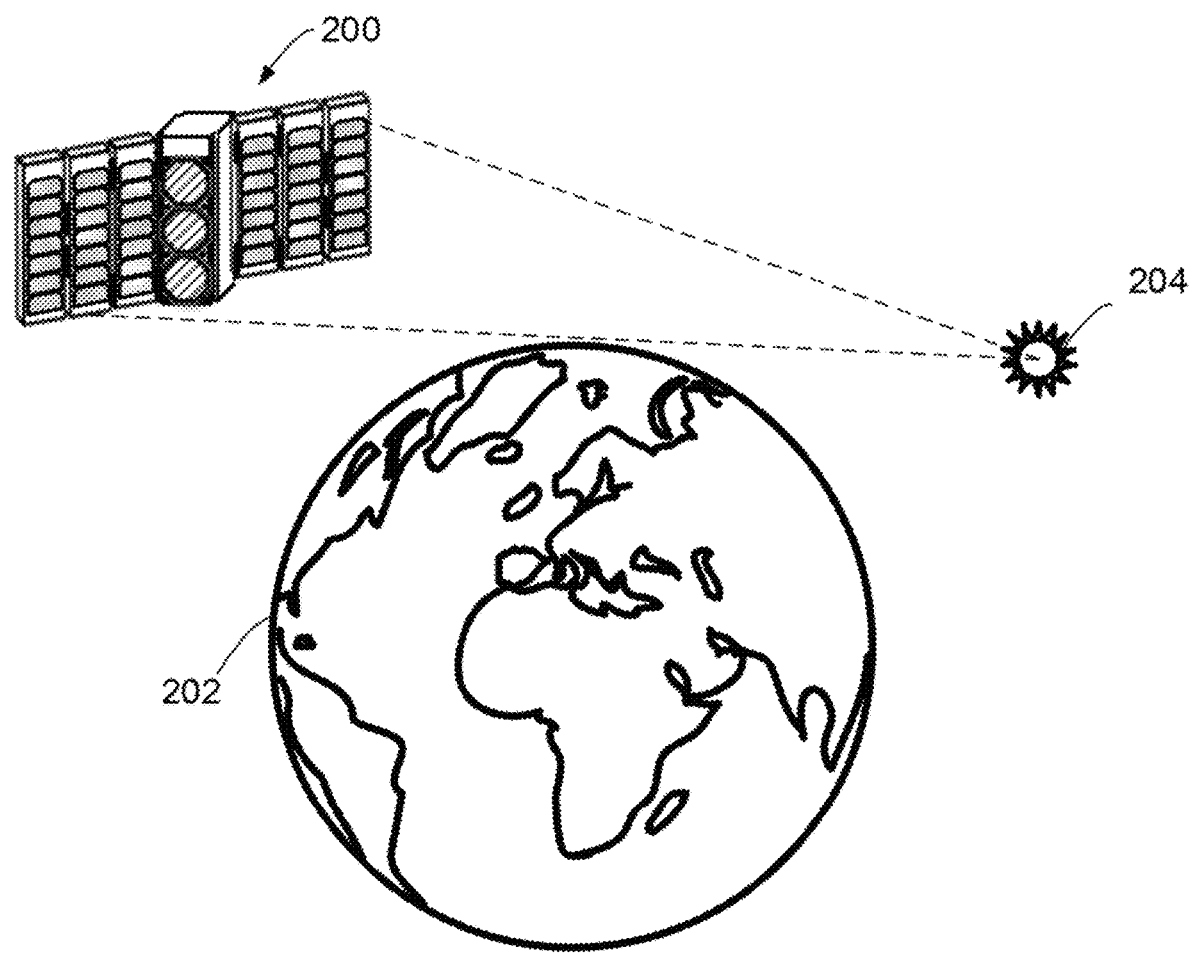
FIG. 2 is an example illustration of a satellite 200 deployed into orbit relative to earth 202 and configured to receive solar energy from the sun 204, according to an example implementation of the disclosed technology.

FIG. 2 is an example illustration (not to scale) depicting a setting of the disclosed technology in which a satellite 200 (having unfolded solar panels) is deployed into orbit relative to earth 202 and configured to receive solar energy from the sun 204. According to certain example implementations of the disclosed technology, the satellite 200 may be a CubeSat deployed into low earth orbit. As defined herein, and according to an example implementation of the disclosed technology, a CubeSat may be generally defined as a class of nano-satellites, with dimensions approximately 10 cm×10 cm×10 cm for each 1 unit (referred to in the industry as 1U, being the basic building block of CubeSats which can be arranged in 1U, 2U, 3U, 6U, or other formats), and having approximately 1.5 kg of mass per 1U. For example, a 3U CubeSat would be approximately 10 cm×10 cm×30 cm and 4.5 kg, being an arrangement of three 1U CubeSats. While a 3U CubeSat is depicted and discussed herein, the disclosed technology is not limited to 3U CubeSats, and may be applied to a wide variety of other types of satellites in other associated orbits, including other types of CubeSats.

As will be discussed herein, various aspects of the disclosed technology may provide certain technical features and benefits associated with deploying a satellite 200 into orbit, including but not limited to: terrestrial preparation and testing, folding and securing the solar arrays to the body of the satellite 200, reducing volume of the stowed satellite 200, providing standby power via exposed solar cells when stowed, reliably releasing and deploying the folded solar arrays when in orbit, etc.

Stowing and Unfolding of Solar Panels

Figures 3A, 3B:
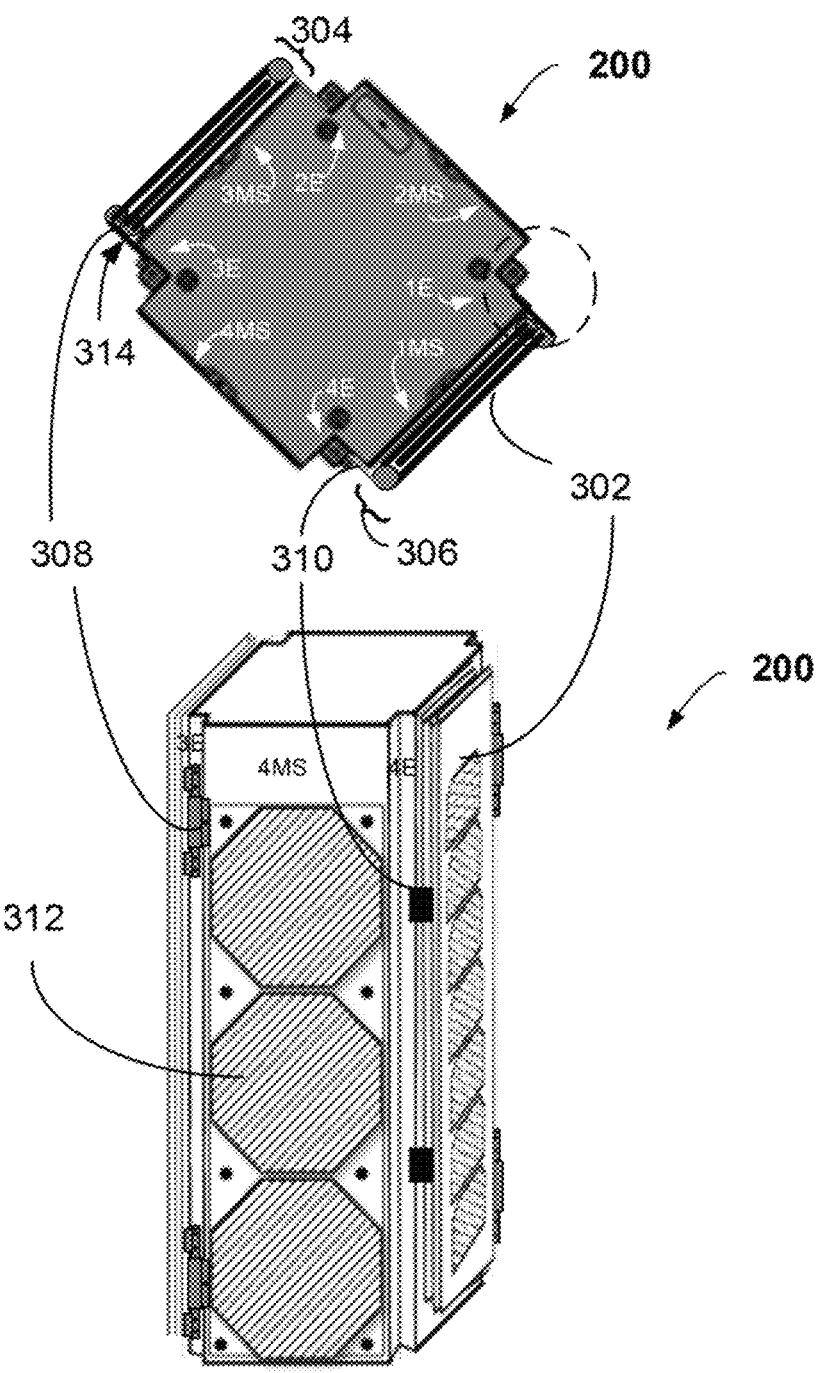
FIG. 3A is a top-view illustration of a satellite 200 in a stowed configuration, according to an example implementation of the disclosed technology.
FIG. 3B is a perspective view illustration of a satellite 200 in a stowed configuration, according to an example implementation of the disclosed technology.

FIG. 3A and FIG. 3B depict respective top-view and perspective view illustrations of a satellite 200 in a stowed configuration, according to an example implementation of the disclosed technology. As shown in the top-view FIG. 3A, a relative orientation (for descriptive purposes) of the first, second, third, and fourth major sides of the satellite 200 may be denoted respectfully as 1MS, 2MS, 3MS, and 4MS. For example, FIG. 3B is depicted with the forth major side 4MS closest to the viewer. Also, as shown in the top-view FIG. 3A are first, second, third and fourth edge regions denoted respectfully as 1E, 2E, 3E, and 4E. These edge regions (as depicted, for example, by the dashed circle around the first edge region 1E) are disposed between the corresponding first and second, second and third, third and fourth, and fourth and first major sides. For example, FIG. 3B is depicted with the fourth edge (4E) between the fourth and first major sides. In certain example implementations, the edge regions may include additional features, shapes, cut-outs, etc. In certain example implementations, the "edge regions" may comprise regions at or near the corners of the satellite 200. For example, the edge region may extend from a center of a major side face to a corresponding edge (i.e., 0-50% of the width of the major side face). In certain example implementations, the edge region may include 0-25 percent of the width of the satellite 200. In certain example implementations, the edge region may include 0-10 percent of the width of the satellite 200. In certain example implementations of the disclosed technology, the edge region may be defined such that the panels attached within the edge region substantially cover a major side of the satellite 200.

In this example configuration shown in FIGS. 3A and 3B, the individual solar panels 302 of the associated arrays 304, 306 are shown folded-up in a planar "rolled" compact arrangement against respective body sides the satellite 200 (as will be discussed further below with respect to FIGS. 4A-7D). According to an example implementation of the disclosed technology, the panels 302 may be joined with hinge assemblies 308 (for example, in or near opposite edge regions 1E, 3E), and secured with one or more hold down release mechanisms (HDRM) 310 (for example, in or near the corresponding adjacent edge regions 4E and 2E). In certain example implementations, the hinge assemblies 308 that join the arrays 304 306 to the body of the satellite 200 may be configured to include and/or be attached to an extension piece 314, for example, to accommodate the thickness of the outer panels when in the stowed configuration. An example implementation of the extension piece 314 is also shown in FIG. 6B.

The general configuration of the panels 302, hinge assemblies 308 and/or the HDRMs 310, as depicted in FIG. 3A and FIG. 3B is shown here for illustration purposes only, and may not be to scale. Example implementations with additional details, including positioning, size, shape, and operation of these components, will be discussed below with respect to the subsequent figures.

In accordance with certain example implementations of the disclosed technology, one or more separate fixed solar panels 312 may be attached to one or more respective body sides of the satellite 200, and adjacent to the folded arrays 304, 306. According to an example implementation of the disclosed technology, the fixed solar panels 312 may enable the satellite 200 to collect solar power when stowed and/or deployed providing at least some power in the event of a deployment failure.

Figure 1:
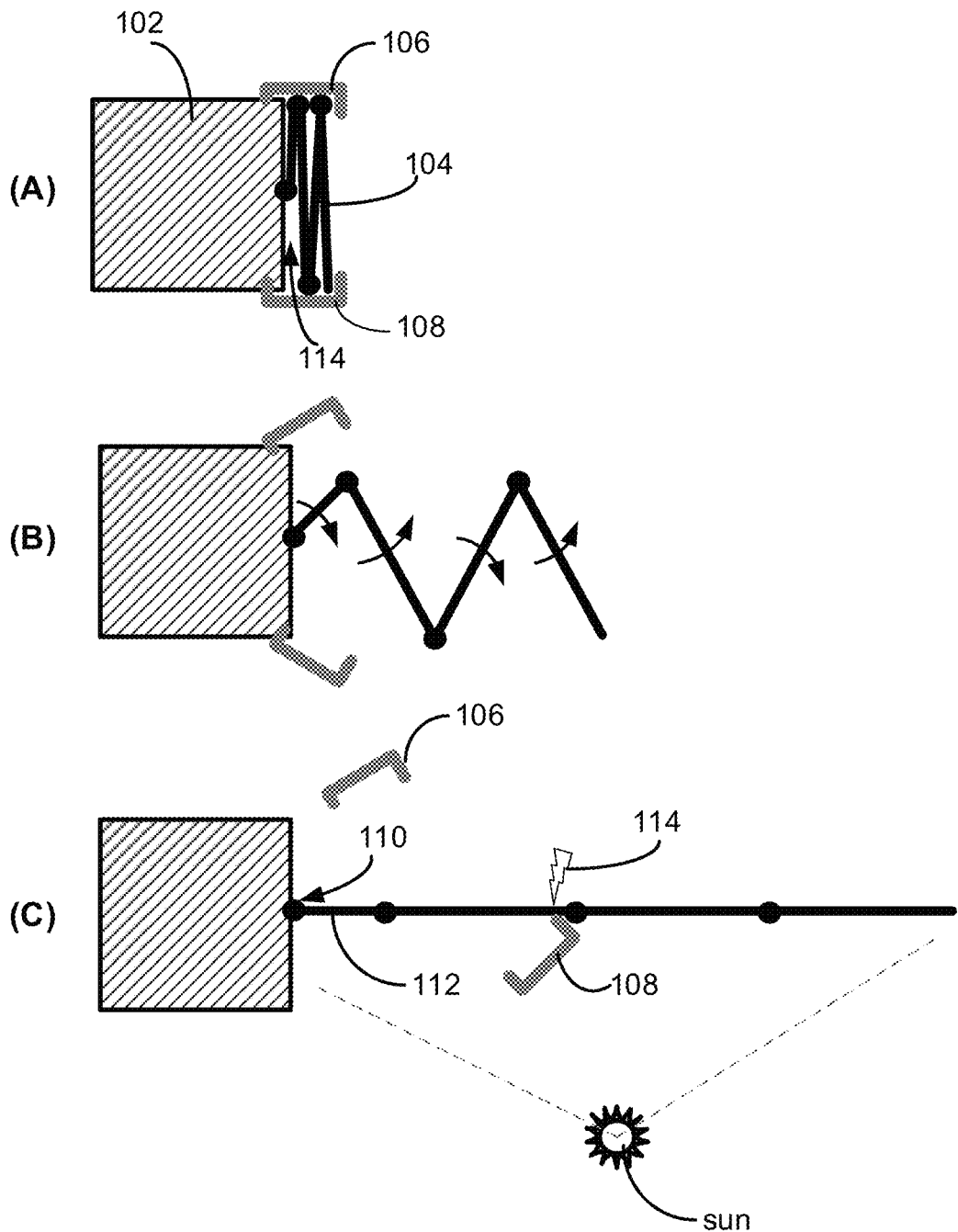
FIG. 1 depicts a top-view example representation of a prior art satellite 102 with an "accordion"-style solar panel array 104 arrangement in stowed (A), unfolding (B), and deployed (C) positions.
Figure 4A:
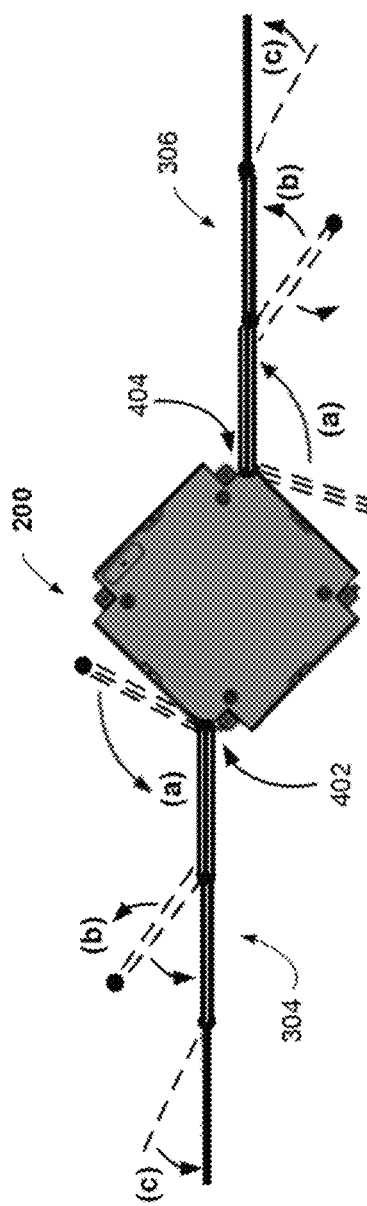
FIG. 4A is an example top-view illustration of the satellite 200 with the arrays 304, 306 shown in the various stages (a), (b), (c) of an unfolding sequence, according to an example implementation of the disclosed technology.
Figure 4B:
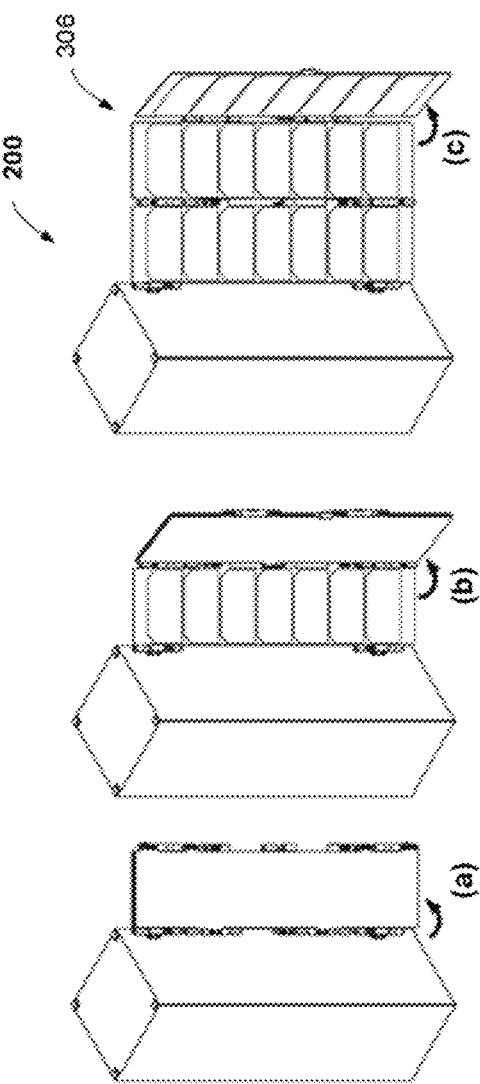
FIG. 4B is an example perspective view illustration of the satellite 200 with one array 306 shown in the various stages (a), (b), (c) of an unfolding sequence (corresponding to the stages shown in FIG. 4A), according to an example implementation of the disclosed technology.

FIG. 4A and FIG. 4B depict respective example top-view and 3D-view illustrations of the satellite 200 with the arrays 304, 306 shown in the various stages (a), (b), (c) of an unfolding sequence, according to an example implementation of the disclosed technology. For simplicity, only one of the arrays 306 is depicted in FIG. 4B. As illustrated, and according to an example implementation of the disclosed technology, the arrays 304, 306 may be joined to the body of the satellite 200 at or near respective opposite corner edges 402, 404 of the satellite, in contrast with prior art systems in which the arrays are attached at a midpoint (such as midpoint 110 as discussed above with respect to FIG. 1). Furthermore, in contrast to prior art systems that utilize an "accordion" folding arrangement (as discussed with respect to FIG. 1), certain example implementations of the disclosed technology provide a planar "rolled-up wing" structure in which the individual planar panels 302 of the arrays 304, 306 each unfold/unroll in a unified direction (such as counter clockwise when viewed from the top, as illustrated in FIG. 4A). According to an example implementation of the disclosed technology, the planar "rolled-up wing" structure and unified unfolding direction enables the respective arrays 304, 306 to be attached at or near corner edges 402, 404 of the satellite by hinges 308, and secured with a reduced number of hold down release mechanisms (HDRMs) 310, as shown in FIGS. 3A and 3B, without requiring such HDRMs 310 to also secure the arrays 304, 306 at the corner edges 402, 404. As will be subsequently explained below, certain hinge, cam, and stop features, etc., may be utilized to simplify the stowing and subsequent unfolding of the arrays 304, 306.

Figure 5A:
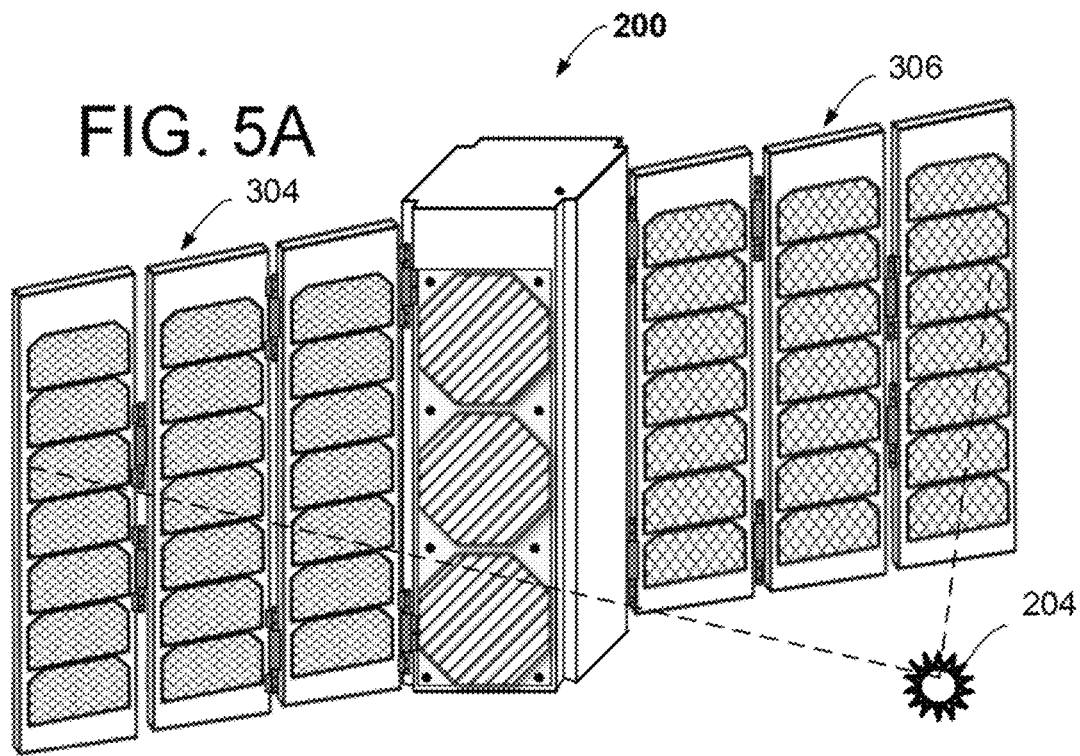
FIG. 5A is a top-front perspective view depiction of a deployed satellite 200, according to an example implementation of the disclosed technology.

FIG. 5A is a top-front view depiction of a deployed satellite 200, according to an example implementation of the disclosed technology. According to certain example implementations, the satellite 200 may be deployed in an orientation such that the front sides of the arrays 304, 306 having the most solar cells face the sun 204 (not to scale) for maximum solar power harvesting potential.

Figure 5B:
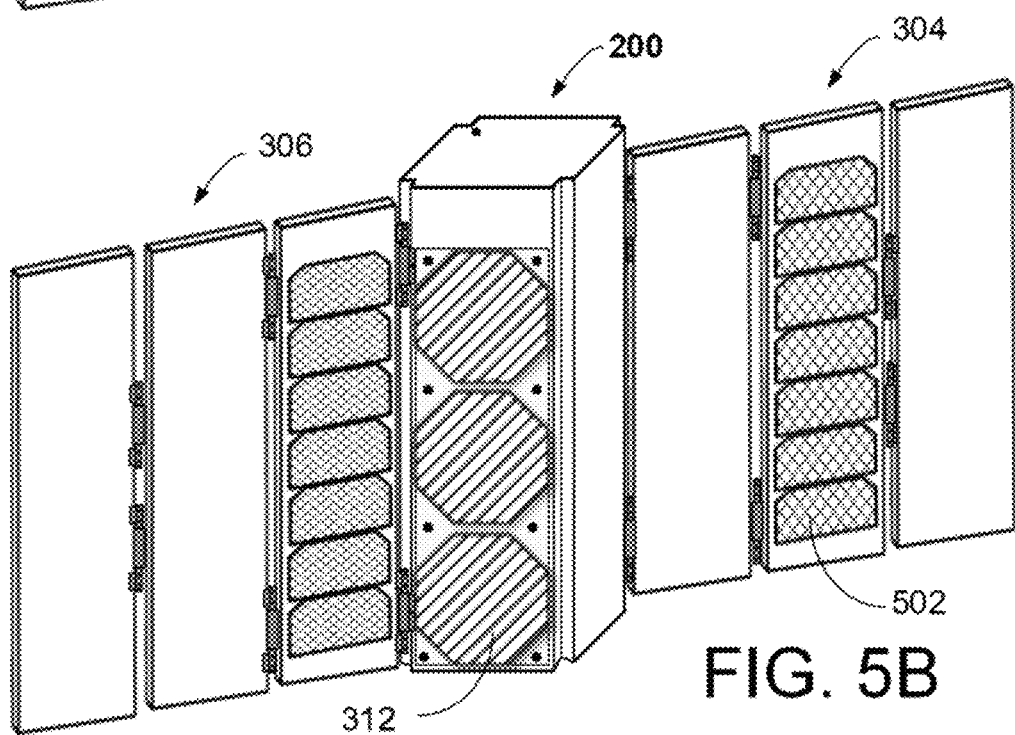
FIG. 5B is top-rear view perspective depiction of a deployed satellite 200, according to an example implementation of the disclosed technology.

FIG. 5B is top-rear view depiction of a deployed satellite 200, according to an example implementation of the disclosed technology, in which at least a portion of the back sides of the arrays 304, 306 are populated with solar cells 502. According to an example implementation of the disclosed technology, this arrangement (of solar cells 502 on the back sides) may allow for a certain amount of solar power harvesting even when the front side of the arrays 304, 306 of satellite 200 are not facing sun 204. In such instances, for example, the satellite 200 may still operate as intended. In certain example implementations, the satellite 200 may operate with reduced functionality. In certain example implementations, the satellite 200 may continue to harvest solar power via the solar cells 502 on the back sides of the arrays 304, 306 and/or one or more separate fixed solar panels 312. In certain implementation, the partially-populated back sides of the arrays 304, 306 and/or one or more separate fixed solar panels 312 may provide enough power (when fully or partially facing the sun) to charge batteries, power electronics, power orientation correction propulsion systems, operate communication radios, etc. Thus, certain implementations of the disclosed technology may enable harvesting solar power, even in cases where the satellite 200 is deployed in an undesirable orientation with respect to the sun 204.

Unfolding Deployment Control Mechanisms

FIGS. 6A-6D depict the operation of an inner panel unfolding/retention/sequencing first stage mechanism 602, according to certain example implementations of the disclosed technology. The satellite 200 depicted in FIG. 6A (left) is shown for simplicity with only one array 306 unfolding, however, certain implementation may include another foldable/unfoldable array (such as array 304 as shown in FIG. 4A and FIG. 5A). In certain example implementations, the first stage mechanism 602 includes an offset cam 604 and a stop 606 that are configured to engage during rotation to prevent the unfolding of the middle panel 610 and the outermost panel 612 until the innermost panel 608 has rotated enough beyond a first predetermined angle, i.e., to provide sufficient clearance for the rotation of the middle panel 610 and the outermost panel 612 without scraping, disturbing, or otherwise touching the body of the satellite 200. For example, the stop 606 may be configured with appropriate geometries and the cam 604 may be configured with the appropriate axial offset such that the cam 604 remains constrained by the stop 606 until the array 306 rotates greater than about 90 degrees from the stowed position (such as the stowed position depicted in FIG. 6B). In certain example implementations, the cam 604 may be integrated with the panel hinge, as will be explained below.

Figure 6A:
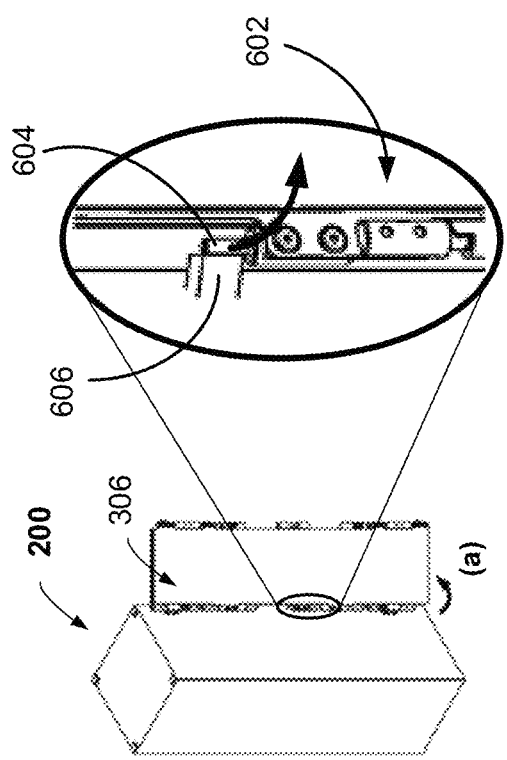
FIG. 6A depicts the satellite 200 in an unfolding stage (as depicted in the corresponding initial unfolding stage (a) of FIGS. 4A and 4B) in which the cam 604 remains constrained by the stop 606.
Figure 6D:
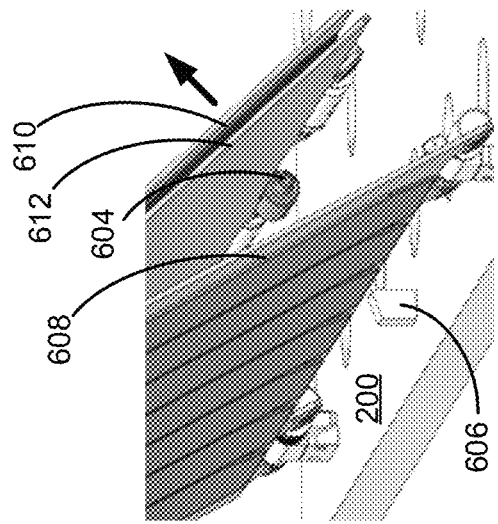
FIG. 6D depicts the panels 608, 610, 612 in a mid-deployment stage in which the innermost panel 608 has rotated past the first predetermined rotation angle, allowing the offset cam 604 to clear the stop 606, thereby allowing the middle panel 610 and the outermost panel 612 to swing clear of the innermost panel 608 and the body of the satellite 200.

FIG. 6A depicts the satellite 200 in an unfolding stage (as depicted in the corresponding initial unfolding stage (a) of FIGS. 4A and 4B) in which the cam 604 remains constrained by the stop 606. In certain example implementations, the stop 606 may be attached to the body of the satellite 200 and may be configured to engage with the cam 604 during the initial unfolding stage. According to an example implementation of the disclosed technology, a release mechanism may be utilized to initiate the unfolding process, and a spring integrated with the hinge assembly may provide the force necessary to unfold the panels, as will be further explained below with reference to the hinge assembly.

In certain example implementations, the stop 606 may have a tapered shape, as depicted. In other example implementations, the stop 606 may include other shapes and features, including but not limited to notches, surface treatments, etc. For example, in certain implementations, the stop 606 may be configured with a smooth sliding surface to enable easy disengagement from the cam 604 once the innermost panel 608 has unfolded past a first predetermined angle.

FIG. 6B depicts the panels 608, 610, 612 in a stowed configuration, according to an example implementation of the disclosed technology. According to an example implementation, the radial axis 614 of the cam 604 may be offset from the corresponding radial axis 616 of the hinge. In this configuration, the cam 604 may engage with the stop 606 to secure the middle panel 610 and the outermost panel 612 against or adjacent to the innermost panel 608. In accordance with certain example implementations of the disclosed technology, the cam 604 may be attached to a hinge assembly and disposed between the middle panel 610 and the outermost panel 612. In certain example implementations, the hinge assemblies 308 that join the innermost panel 608 to the body of the satellite 200 may be configured to include and/or be attached to an extension piece 314, for example, to accommodate the thickness of the panels 608, 610, 612 when in the stowed configuration.

Figure 6C:
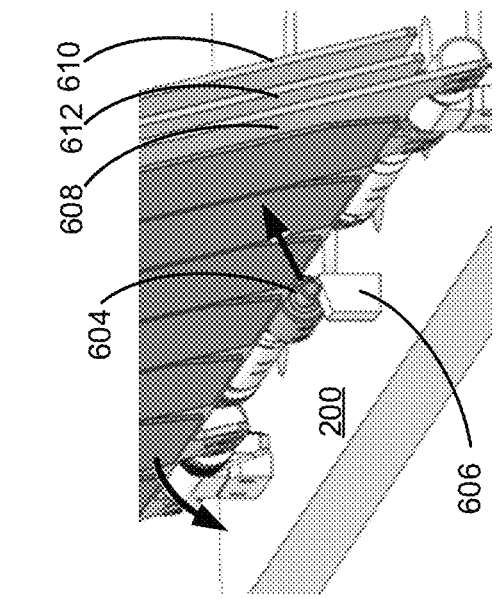
FIG. 6C depicts the panels 608, 610, 612 in a stage of rotation (similar the stage of rotation shown in FIG. 6A) before the first predetermined angle of rotation has been exceeded.
Figure 6B:
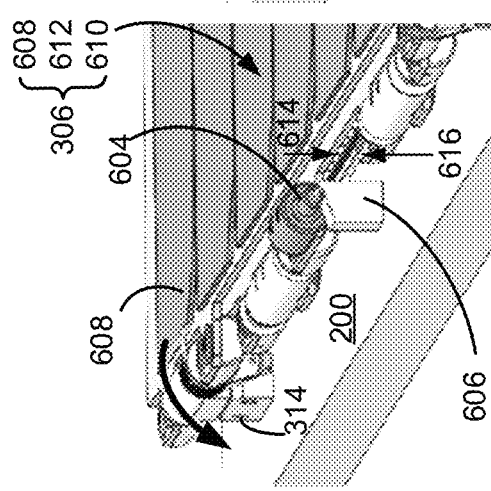
FIG. 6B depicts the panels 608, 610, 612 in a stowed configuration, according to an example implementation of the disclosed technology.

FIG. 6C depicts the panels 608, 610, 612 in a stage of rotation (similar to the stage of rotation shown in FIG. 6A) before the first predetermined angle of rotation has been exceeded. In this position, the cam 604 is still engaged with the stop 606, thereby holding the middle panel 610 and the outermost panel 612 adjacent to the innermost panel 608.

FIG. 6D depicts the panels 608, 610, 612 in a mid-deployment stage in which the innermost panel 608 has rotated past the first predetermined rotation angle, allowing the offset cam 604 to clear the stop 606, thereby allowing the middle panel 610 and the outermost panel 612 to swing clear of the innermost panel 608 and the body of the satellite 200.

FIGS. 7A-7D depict the operation of an unfolding/retention second stage mechanism 702, according to an example implementation of the disclosed technology. The satellite 200 depicted in FIG. 7A (left) is shown for simplicity with only one array 306 unfolding, however, certain implementations may include another foldable/unfoldable array (such as array 304 as shown in FIG. 4A and FIG. 5A). In certain example implementations, the second stage mechanism 702 includes a cam 704 and a stop 706 that are configured to engage during rotation to prevent the unfolding of the outermost panel 612 until the middle panel 610 has rotated enough beyond a second predetermined angle, i.e., to provide sufficient clearance for the rotation of the outermost panel 612 without scraping, disturbing, or otherwise touching the body of the satellite 200. For example, the stop 706 and cam 704 may be configured with appropriate geometries such that the cam 704 remains constrained by the stop 706 until the engaged middle panel 610 and outermost panel 612 rotate together to about 180 degrees away from the face of the innermost panel 608.

FIG. 7A depicts the satellite 200 in an unfolding stage (as depicted in the corresponding second unfolding stage (b) of FIGS. 4A and 4B) in which the cam 704 remains constrained by the stop 706. In certain example implementations, the stop 706 may be attached to the innermost panel 608 and may be configured to engage with the cam 704 during the first stage of unfolding, and also during the initial portion of second stage of unfolding. In certain example implementations, the cam 704 may be attached to the outermost panel 612.

In certain example implementations, the cam 704 may be cylindrical, as depicted. In other example implementations, the cam 704 may include other shapes and features, including but not limited to notches, surface treatments, etc. For example, in certain implementations, the cam 704 may be configured with a smooth sliding surface to enable easy disengagement from the stop 706 once the middle panel 610 has unfolded past the second predetermined angle.

FIG. 7B depicts the panels 608, 610, 612 during a first stage of unfolding (such as described above and as depicted in FIG. 6A or FIG. 6C), according to an example implementation of the disclosed technology. In this configuration, the cam 704 may engage with the stop 706 to secure the middle panel 610 against (or adjacent to) the outermost panel 612.

FIG. 7C depicts the panels 608, 610, 612 near a second stage of rotation, i.e. right before the second predetermined angle of rotation has been exceeded. In this position, the cam 704 is still engaged with the stop 706, thereby securing the outermost panel 612 folded towards/against the middle panel 610.

FIG. 7D depicts the panels 608, 610, 612 in a final-deployment stage in which the innermost panel 608 has rotated past the first predetermined rotation angle, and where the middle panel 610 and outermost panel 612 have rotated past the second predetermined rotation angle, allowing the cam 704 to clear the stop 706, thereby allowing the outermost panel 612 to swing clear of the innermost panel 608 and the body of the satellite 200.

As depicted in FIG. 8A and FIG. 8B, an array 306 (shown folded in FIG. 8B) may be held to the body of the satellite 200 by hinges 308 along one edge, while hold down release mechanisms (HDRMs) 310 (see FIGS. 3A and 3B) can be placed along the opposite edge of a folded array 306 so that it may be effectively restrained when stowed. In addition, and according to certain example implementations, spacers 802 may be placed between the satellite 200, and each of the panels 608, 610, 612 of the array 306, providing more protection from vibration and shock. In certain example implementations, the entire stack of panels 608, 610, 612 may be secured firmly against the mounting body of the satellite, which may provide certain protections for the fragile solar cells. Since the hinges 308 and HDRM 310 points are disposed along the edges of the panels, there is more available surface area on the panel for components, including solar cells. In certain implementations, the above features may result in a resilient package when stowed, which may allow use of thinner panels that can be lighter and can be packed more densely. Another beneficial aspect of stowing the panels 608, 610, 612 of the array 306 in the planar rolled configuration is that such arrangement allows the innermost panel 608 to surround and constrain the other panels 610 612 against the satellite 200 when stowed so that the first hinge 308 secures the array 306 against one edge, while the HDRM secures the array 306 against the adjacent edge. In contrast, accordion-type arrangements may require HDRMs along both edges (in addition to hinges). Thus, certain aspects of the disclosed technology provide deployable satellite solar panels with reduced components, reduced associated weight, and reduced bulk.

Hinge Assembly

Figure 9A:
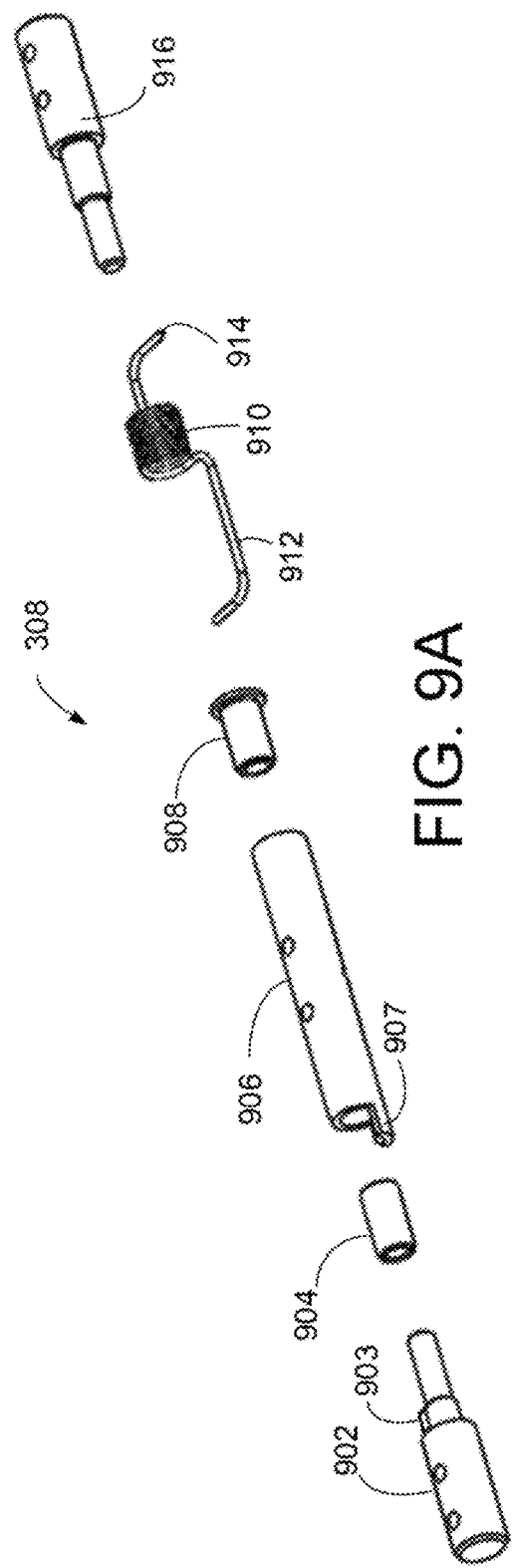
FIG. 9A is an exploded-view illustration of a hinge assembly 308, according to an example implementation of the disclosed technology.
Figure 9B:
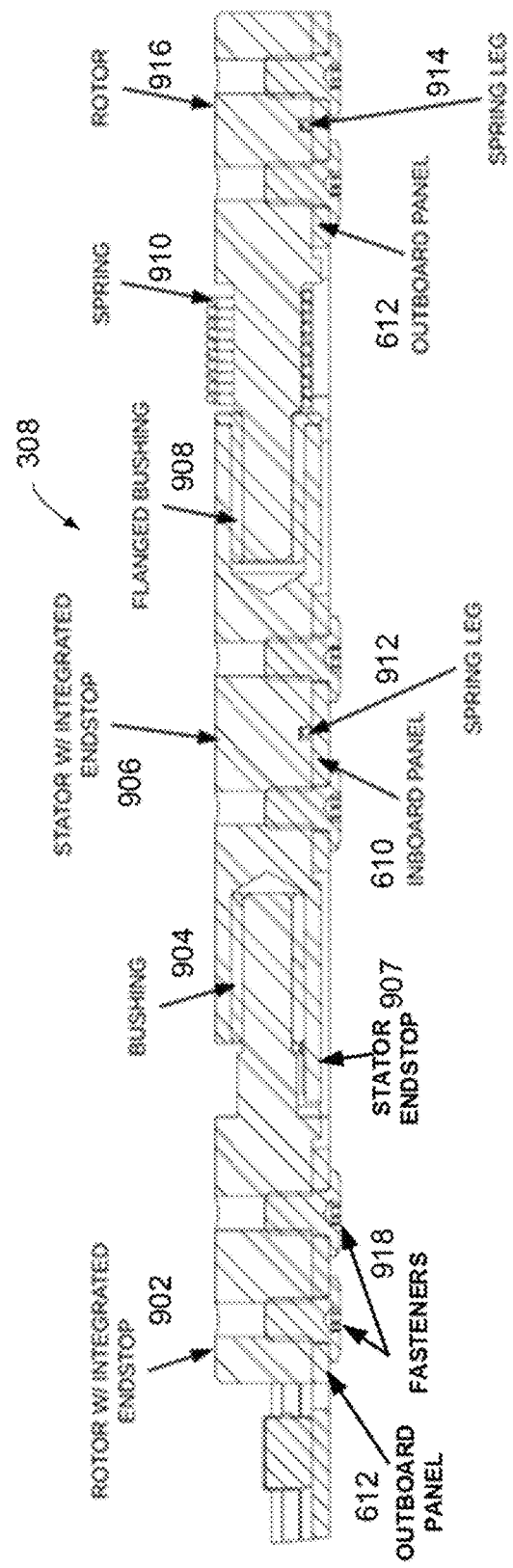
FIG. 9B is a cross-sectional side-view illustration of the hinge assembly 308.

FIG. 9A is an exploded-view illustration of a hinge assembly 308, according to an example implementation of the disclosed technology. FIG. 9B is a cross-sectional view of the hinge assembly 308. Certain example implementations of the hinge assembly 308 may be utilized to join an inboard panel (such as the middle panel 610 shown in FIG. 6D) with an outboard panel (such as the outermost panel 612 shown in FIG. 6D). In certain example implementations, a similarly configured hinge assembly 308 may be utilized to join the innermost panel of the array (such as panel 608 as shown in FIG. 6D) to the body of the satellite 200.

In accordance with certain example implementations of the disclosed technology, the hinge assembly 308 may include one or more of the following components: a first rotor 902 with an integrated end stop 903, a bushing 904, a stator 906 with an integrated end stop 907, a flanged bushing 908, a spring 910 having a first leg section 912 and a second leg section 914, and a second rotor 916. As shown in FIG. 9B, the associated components 902-916 of the hinge assembly 308 may be attached by fasteners 918 to respective portions of satellite body, inboard panels and/or outboard panels (for example, panel 610 and/or panel 612) of the arrays.

According to an example implementation of the disclosed technology, the first rotor 902 may act as a mounting structure to the outboard panel, and may also act as a rotating pin with the mechanical end stop 903 for constraining the hinge rotation. The end stop 903, for example may set a deployed position of the panel without relying on additional hardware to be mounted to the panels. The bushing 904, for example, may provide a sliding surface for the rotation of the rotor 902. The stator 906, for example, may act as a mounting structure for the inboard panels (for example, panel 610 and/or panel 608), and the integrated end stop 907 of the stator 906 may engage with an end stop 903 portion of the first rotor 902, for example, to limit the rotational range of the hinge 308. The flanged bushing 908, for example, may provide a sliding surface for the rotation of the second rotor 916 which may constrain the hinge axially. The second rotor 916, for example, may act as a rotating pin and mounting structure for attachment to the outboard panels (for example, panel 610 and/or panel 612) of the arrays. The spring 910, for example may provide stored energy and actuation force for the deployment of the associated panels.

In certain example implementations, the hinges 308 may be designed with two rotational range variants: 135 degrees; and 180 degrees. For example, the hinges 308 configured with the 135-degree rotational range may be attached to the satellite body 200 and the inner edge of the innermost panel 608, while the 180 degree variants may be utilized to join the middle panel 610 with the innermost panel 608 and the outermost panel 612.

In accordance with certain example implementations of the disclosed technology, the integrated spring 910 in each hinge assembly 308 may be utilized to supply the opening force for deployment of the associated solar panels. In certain example implementations, first leg section 912 of the spring 910 may be restrained by the stator 906, while the second leg section 914 may be restrained by the second rotor 916.

In certain example implementations of the disclosed technology, the integrated end stop 903 of the first rotor 902 and the integrated stop 907 of the stator 906 may be configured to fix the final deployed position of the array. The spring 910, for example, may be configured to provide not only the opening force for the associated panels, but may also provide the adequate force to retain the panels in the deployed (open) position when the respective end stop 903 of the first rotor 902 is engaged with end stop 907 the stator 906.

According to certain example implementations of the disclosed technology, one or more of the components of the hinge assembly 308 may be sized as needed. For example, the length of the stator 906 may be configured differently depending on the intended placement of the hinge assembly 308. In other example implementations, each of the hinge assemblies 308 may have a substantially similar geometry. According to an example implementation of the disclosed technology, each hinge may fit within a defined volume along the side of the panel without intruding onto a volume defined by the associated panel.

Certain example implementations of the disclosed technology utilize low-profile screws as fasteners 918 to attach to the panels, which may help avoid certain inaccuracies in panel mounting hole placement, and may also help avoid certain frictions in the operation of the hinge 308.

According to an example implementation of the disclosed technology, the hinge assemblies 308 may be contained within the area along the edge of the respective panels such that they do not impinge on the center area of the panel. According to an example implementation of the disclosed technology, the functional elements 902-918 of the installed hinge assemblies 308 may be configured to occupy a volume at the edge of the panels to provide maximal surface area for components such as solar arrays. In certain example implementations, the mechanical design of the panel may be decoupled from the electrical design and layout of the panel solar cells.

Figure 10:
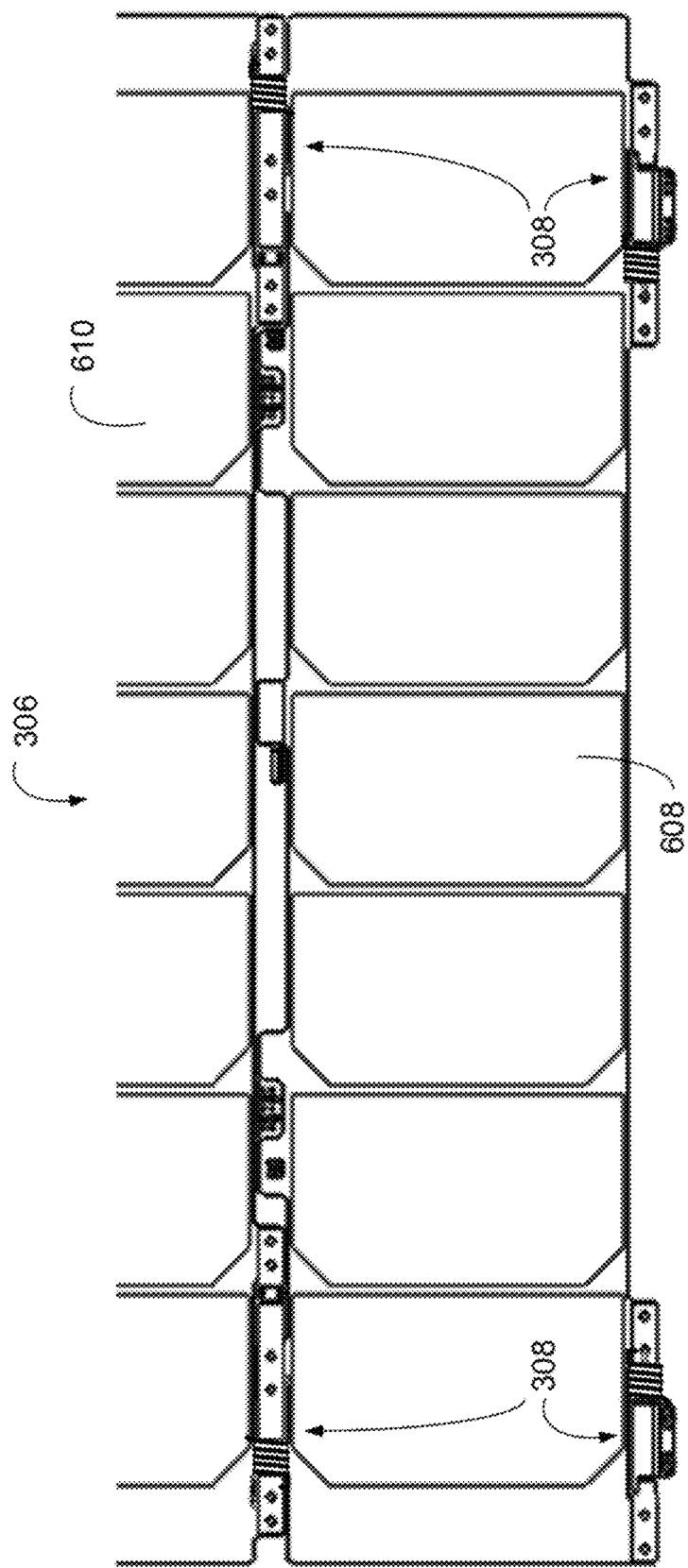
FIG. 10 illustrates a partial view of a solar pane array 306 and an example mirrored pair positioning and orientation of the hinge assemblies 308 with respect to the innermost panel 608 and the middle panel 610, according to an example implementation of the disclosed technology.

FIG. 10 illustrates a partial view of a solar pane array 306 and an example mirrored pair positioning and orientation of the hinge assemblies 308 with respect to the innermost panel 608 and the middle panel 610, according to an example implementation of the disclosed technology.

Hold Down Release Mechanism (HDRM)

FIG. 11A is a 3D illustration of a hold down and release mechanism (HDRM) 310 (as also depicted in FIGS. 3A, 3B, 8A, and 8B) according to an example implementation of the disclosed technology. FIG. 11B is a cross sectional side-view illustration of the HDRM 310, with like components as depicted in FIG. 11A.

According to an example implementation of the disclosed technology, the HDRM 310 may include one or more cylindrical burn resistors 1102 that are configured to heat up when current passes through them, thereby severing the burn wire 1106 (herein also referred to as monofilament 1106) and allowing the panels 608, 610, 612 to unfold and deploy via the force of the springs (such as spring 910 as shown in FIGS. 9A and 9B. In certain example implementations, the cylindrical burn resistors 1102 may be mounted to a circuit board 1110, which in certain implementations, may also act as a thermal isolation panel to at least partially constrain the heat generated when current flows through the burn resistors 1102. In one example implementation of the disclosed technology, the burn resistors 1102 may be mounted to a surface of circuit board 1110. In another example implementation, the burn resistors 1102 may be "pigtail" style and mounted to the circuit board 1110 via leads, through holes, etc.

According to an example implementation of the disclosed technology, restraining hooks 1104 may be mounted to the circuit board 1110 and disposed on either side of the cylindrical burn resistors 1102 to act as restraining guides for a monofilament 1106, and to increase the effective contact surface area between the monofilament 1106 and burn resistors 1102. According to an example implementation of the disclosed technology, the monofilament 1106 may be threaded through the restraining hooks 1104, tightened, and secured at both ends by hold-down screws 1108 such that the monofilament 1106 makes intimate contact with one or more of the cylindrical burn resistors 1102.

In accordance with certain example implementations of the disclosed technology, one of more additional monofilament segments 1107 (as depicted with dashed lines in FIG. 11A) may be utilized to further secure the panels against the satellite body 200. The additional monofilament segments 1107, for example, may provide additional tie-down strength for stowage of the associated panels without requiring additional burn resistors 1102. In certain example implementations, the additional monofilament segments 1107 may be secured with common hold down screws 1108. In other certain example implementations, the additional monofilament segments 1107 may be secured with separate hold down screws (not shown). In some example implementations, the additional monofilament segments 1107 may be looped and tied to itself (in a similar fashion to the monofilament 1208 as discussed below and shown in FIG. 12).

In certain example implementations, the circuit board 1110 may be secured to a top surface of the outer panel 608 and co-located with a clearance (for example, a recess in one or more of the panels 608, 610, 612) such that the tightened monofilament 1106 does not touch or rub on edges of the panels 608, 610, 612.

In accordance with certain example implementations of the disclosed technology, one or more washers may be placed between the hold-down screws 1108 and the monofilament 1106 to allow rotation of the hold-down screws 1108 during tightening while avoiding damage to the monofilament 1106. In certain example implementations, the washers may be made of a compressible material (such as rubber or plastic) to provide enhanced gripping friction, and to reduce slipping of the monofilament 1106 when secured by the hold-down screws 1108. In certain example implementations, the washers may include texturing on one side, and a smooth surface on the other side, so that the textured side may secure monofilament 1106 against the satellite body 200, while the smooth side provides slippage of the hold-down screws 1108 during tightening. In certain example implementations, the washer and/or the hold-down screws 1108 may include certain locking features that may help prevent the hold-down screws 1108 from becoming loose during transport, vibration, etc. In certain example implementations, the hold-down screws 1108 may be secured with an adhesive and/or other thread treatments.

In certain example implementations, the restraining hooks 1104 may be made from a metal material. In certain example implementations, the restraining hooks 1104 may include wire bent in a u-shape, fed into plated through holes in the circuit board 1110, and soldered to the circuit board 1110. In certain example implementations, the restraining hooks 1104 may have ends that are bent, flattened, and/or further secured to minimize the possibility of coming disengaged during transport. Certain example implementations of the restraining hooks 1104 may be of sufficient diameter and/or surface smoothness such that the microfilament 1106 is not frayed or otherwise severed, for example, by vibrations during transport.

According to an example implementation of the disclosed technology, the secured monofilament 1106 may be used to restrain the stowed panels 608, 610, 612. For example, the outer stowed panel 608 may be held against the other folded (planar rolled-up) panels 612, 610 (via spacers) and against a portion of the satellite body 200 (or against another appropriate stop portion) by the tightened and secured microfilament 1106, for example to secure the folded array (such as array 306) against the satellite 200 for stowage and pre-deployment.

In certain example implementations, the panels 608, 610, 612 may be folded and secured with the HDRM 310 such that a stow detect switch 1116 is engaged. In certain example implementations, the stow detect switch 1116 may be utilized to provide a signal indicative of whether the panels are in a stowed position. In certain example implementations of the disclosed technology, the stow detect switch 1116 may be positioned directly adjacent to or near the HDRM 310 (for example, at the edge of the outer panel 608 as shown in FIG. 11A) so that any switch engagement errors due to panel flexing, etc. may be minimized.

In accordance with certain example implementations of the disclosed technology, to release the folded array, an appropriate current may be directed through one or more of the burn resistors 1102. The associated resistive heating may be sufficient to melt through the monofilament 1106, thereby releasing the stowed panels and allowing the solar array to planar unroll (in the controlled fashion as discussed above with respect to FIGS. 6A-6D and FIGS. 7A-7D) and open for deployment (as shown in FIG. 5A, for example).

In certain example implementations, the HDRM 310 may include two or more burn resistors 1102 to provide redundancy. In accordance with certain example implementations of the disclosed technology, the resistors 1102 may be wired in parallel (rather than in series) so that at least one of the burn resistors 1102 can conduct current, even if the other one becomes damaged or open circuited.

In accordance with certain example implementations, the monofilament 1106 (as also referred to herein as a "burn wire") may be commercially available fishing line, and may be selected based on tensile strength, melting temperature, etc. In one example implementation of the disclosed technology, the monofilament 1106 may be a 0.12 mm diameter Dyneema® (ultra-high-molecular-weight polyethylene), or similar material which sufficiently weakens at temperatures at approximately 60° C. and above to allow deployment of the mechanism. In certain example implementations, the monofilament 1106 may be selected, as appropriate, to have a diameter that may range from about 0.05 mm to about 0.3 mm. For example, when additional segments 1107 of the monofilament 1106 are utilized in the HDRM 310, the diameter of the monofilament 1106 may be reduced. In certain example implementations, the number of additional segments 1107 of the monofilament 1106 and/or the thickness of the monofilament 1106 may be selected to provide appropriate retention strength while reliably melting during deployment. In certain example implementations, the diameter of the monofilament 1106 (and/or additional segments 1107) may be selected based on the available projected temperature rise of the burn resistors 1102 during deployment. In certain example implementations, the HDRM 310 may include additional thermal shielding (not shown) around the burn resistors 1102 to reduce heat dissipation and increase the available temperature rise associated with the burn resistors 1102 during deployment.

Figure 12:
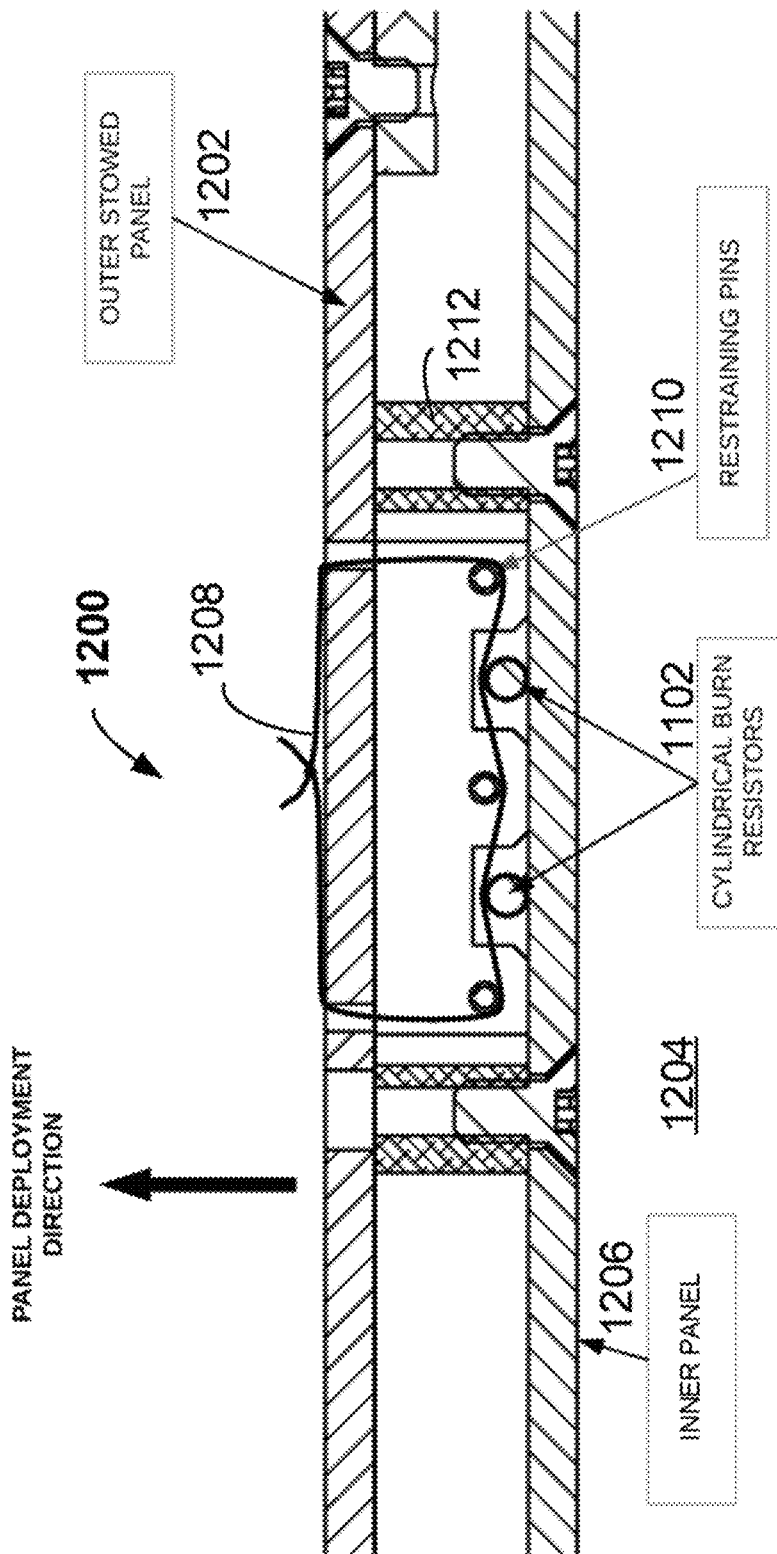
FIG. 12 is a cross sectional side-view illustration of another example implementation of a hold down and release mechanism (HDRM2) 1200.

FIG. 12 is a cross sectional side-view illustration of another example implementation of a hold down and release mechanism (HDRM2) 1200, in which an outer stowed solar panel 1202 may be secured, for example, against the satellite body 1204 and/or against an inner panel 1206 that may be attached to the satellite body 1204. In certain example implementations of the disclosed technology, the inner panel 1206 may be configured to include solar cells (such as the fixed solar panels 312 shown in FIG. 5B.

According to an example implementation of the disclosed technology, the HDRM2 1200 may include one or more cylindrical burn resistors 1102, as previously discussed, that are configured to heat up when current passes through them, thereby severing a burn wire 1208 (such as the monofilament 1106 shown in FIG. 11A), and allowing the outer stowed panel 1202 to unfold and deploy.

According to an example implementation of the disclosed technology, restraining pins 1210 may be disposed on either side of the cylindrical burn resistors 1102 to act as restraining guides for the burn wire 1208, and to increase the effective contact surface area between the burn wire 1208 and burn resistors 1102. According to an example implementation of the disclosed technology, the burn wire 1208 may be installed, tightened, and secured, for example, by a knot, adhesive, and/or deformable collar such that the burn wire 1208 makes extensive contact with one or more of the cylindrical burn resistors 1102 and restrains the outer stowed solar panel 1202, for example, against one or more holdoffs or spacers 1212 between the panels 1202 1206.

Figure 13:
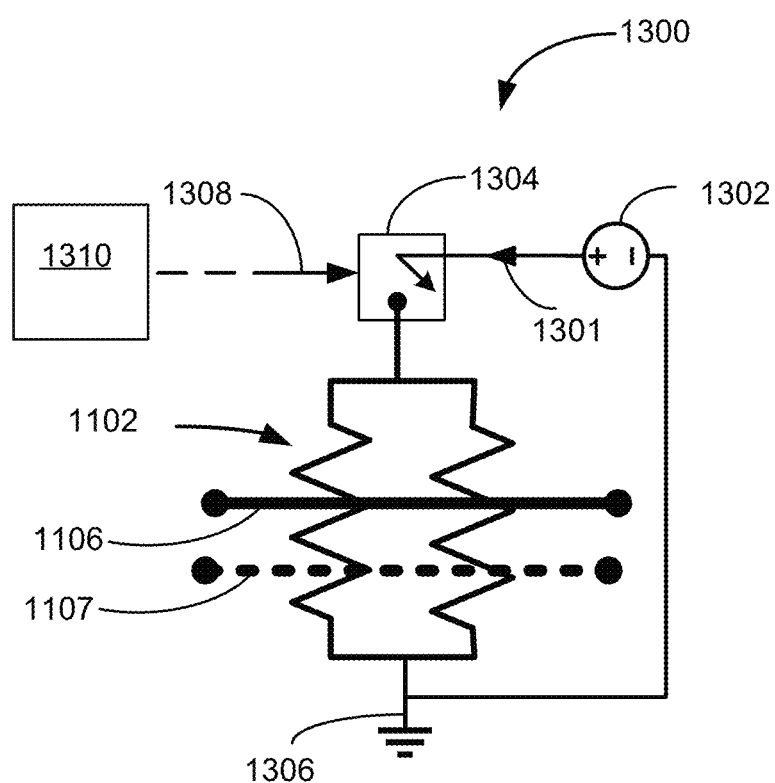
FIG. 13 depicts an example activation circuit 1300 that may be utilized to selectively control a current 1301 through the burn resistors 1102 to sever the monofilament 1106 for controllable deployment of the solar panels.

FIG. 13 depicts an example activation circuit 1300 that may be utilized to selectively control a current 1301 through the burn resistors 1102 to sever the monofilament 1106 (and/or additional/optional monofilament segment 1107) for controllable deployment of the solar panels. For example, a power source 1302 (such as a battery) may be connected to the burn resistors 1102 via a controllable switching device 1304 (such as a relay, solid state switching device, etc.). The activation circuit 1300 may be completed via a common ground 1306. According to an example implementation of the disclosed technology, the controllable switching device 1304 may receive an actuation signal 1308 by an on-board controller 1310 such that when selectively activated, current may flow through the burn resistor(s) 1102.

According to certain example implementations of the disclosed technology, the burn resistors 1102 may be selected based on specific heat capacity, mass, wattage, and resistance so that when the switching device 1304 is actuated to allow current 1301 to flow, the temperature of the burn resistors 1102 will rise above the melting temperature of the monofilament 1106 (~110° C.) in a short period (i.e., less than about 10 seconds). According to an example implementation of the disclosed technology, the melting temperature of the monofilament 1106 may be on the order of 110° C. or above, however there is a temperature point below the melting temperature (experimentally determined between approximately 60° C. and 70° C.) at which certain monofilament 1106 may significantly weaken, to the point that it snaps under the force of the hinge spring. For each implementation of the HDRM, trial experiments with various values of the burn resistors 1102 have been tested to determine values that will sever the monofilament after approximately 5 s. It has been experimentally determined that resistance value of approximately 12 ohms to approximately 20 ohms (in 0204 package) for the burn resistors 1102 provides the desired melting of the monofilament 1106 for excitation voltage across the burn resistors 1102 ranging from approximately 5 volts to approximately 12 volts.

Energy and temperature are related by the heat capacity equation:

$$\Delta T = \frac{\Delta Q}{m\,C},$$

where $\Delta T$ is the temperature rise, $\Delta Q$ is the net added energy, m is the mass of the material and C is the specific heat capacity of the material per unit mass. As an illustration, consider a single 5 ohm, 10 watt, 2 gram, ceramic wire wound resistor (with ceramic having a specific heat of about 1 J/(gK)) and subjected to a 5 volt supply across the resistor for 10 seconds. In this case, and ignoring losses to the environment, 1 amp of current will flow, with an integrated total of 10 joules ($\Delta Q$) applied over the actuation period. The approximate rise in temperature of the resistor for this case would be about 5° C. While the rated wattage of this example resistor may be adequate, the associated temperature rise of the resistor would obviously not be sufficient to melt a nylon-based monofilament.

As another illustration, suppose the (2 gram) resistor above is replaced with a smaller 40 milligram resistor (with all other specs as before). In this example, the rise in temperature could increase by a factor of 50, or to about 250° C. However, as may be appreciated by those having skill in the art, the wattage rating on such a small resistor may not be sufficient. According to certain example implementations of the disclosed technology, the specifications of the burn resistors 1102 (i.e., materials, mass, wattage, resistance, etc.) and the voltage and current capacity of the power source 1302 may be selected such that the temperature of the burn resistors 1102 may be elevated above the melting point of the monofilament 1106 without prematurely destroying the burn resistors 1102 before the monofilament 1106 is severed.

According to certain example implementations of the disclosed technology, the burn resistors 1102 may be 15 ohm thin-film MLEF resistor, rated for 250 mW, in a 0204 package. Although target melting times vary with the physical implementation of the HDRM and ambient temperatures, in an example implementation 8V supply voltage provides sufficient heat to melt the monofilament in approximately 5 seconds at room temperature.

Figure 14:
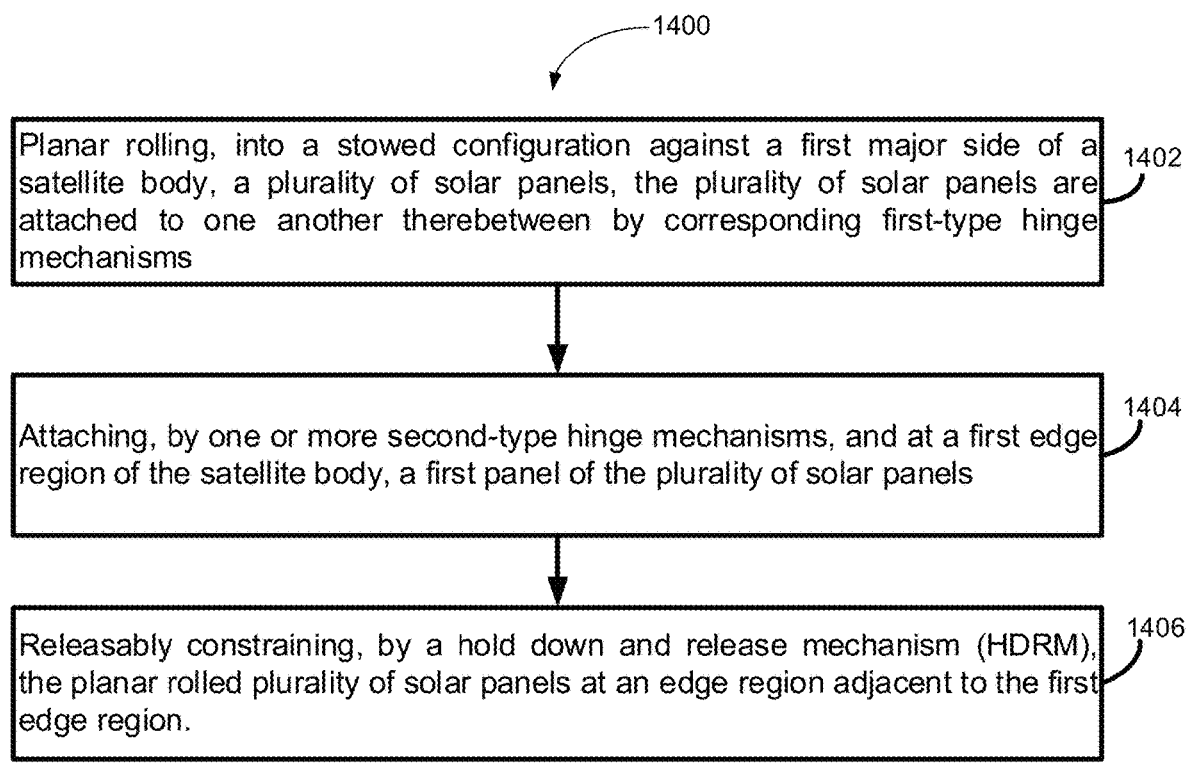
FIG. 14 is a flow diagram of a method 1400, according to an example implementation of the disclosed technology.

FIG. 14 is flow diagram of a method 1400, according to an example implementation of the disclosed technology. In block 1402, the method 1400 includes planar rolling, into a stowed configuration against a first major side of a satellite body, a plurality of solar panels, the plurality of solar panels are attached to one another therebetween by corresponding first-type hinge mechanisms. In block 1404, the method 1400 includes attaching, by one or more second-type hinge mechanisms, and at a first edge region of the satellite body, a first panel of the plurality of solar panels. In block 1406, the method 1400 includes releasably constraining, by a hold down and release mechanism (HDRM), the planar rolled plurality of solar panels at an edge region adjacent to the first edge region.

In certain example implementations, the first-type hinge mechanism may be characterized by a rotation angle range of about 0 when stowed to about 180 degrees when deployed.

In certain example implementations, the second-type hinge mechanism may be characterized by a rotation angle range of about 0 when stowed to about 135 degrees when deployed.

In certain example implementations, the HDRM may be disposed at a fourth edge region of the satellite body, and wherein a first combined rotatable edge of the plurality of solar panels in the stowed position is disposed opposite the second-type hinge mechanism.

In certain example implementations, the second-type hinge mechanism may constrain the deployed linear array by a hinge spring and a hinge stop.

Figure 15:
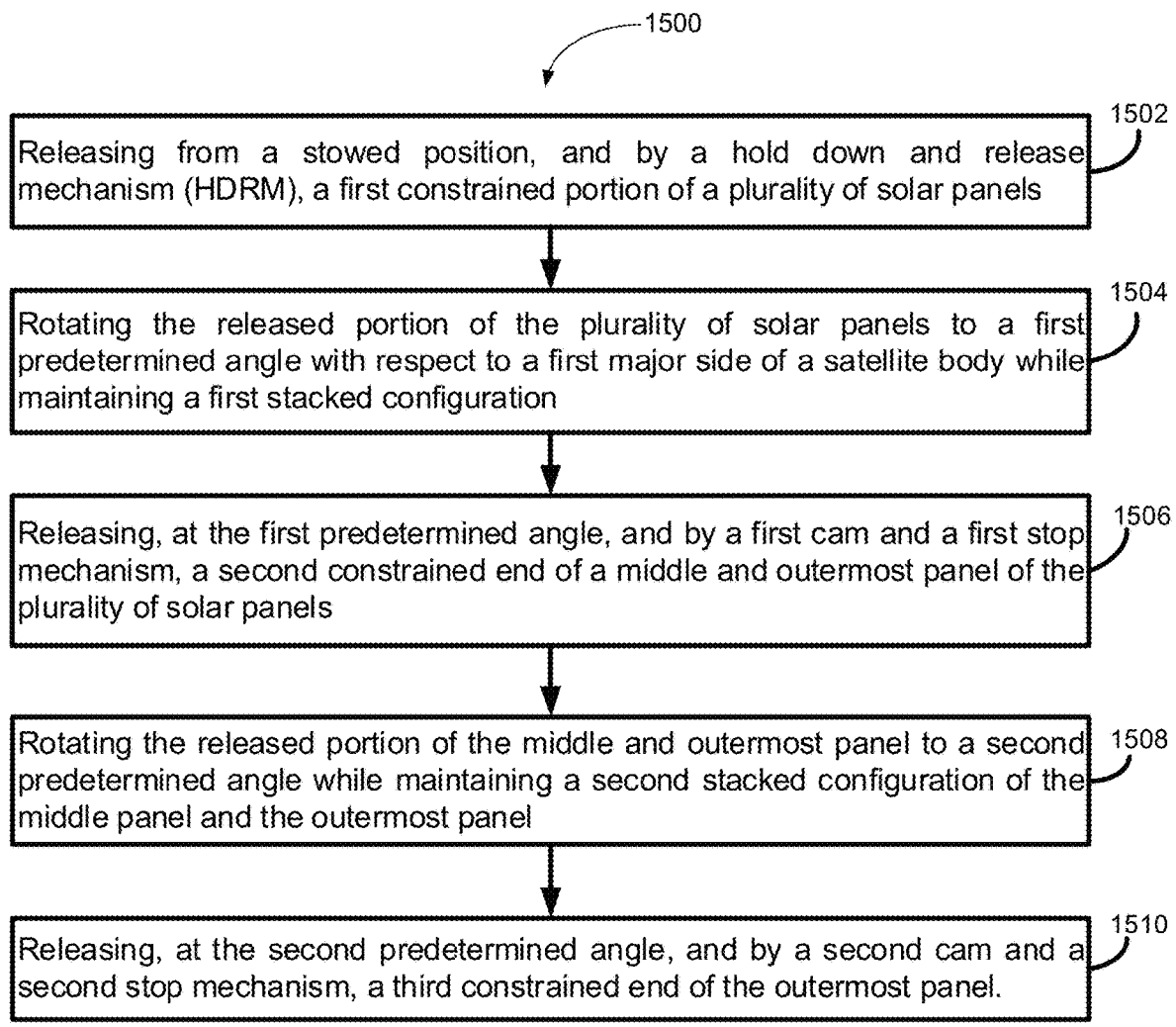
FIG. 15 is a flow diagram of a method 1500, according to an example implementation of the disclosed technology.

FIG. 15 is flow diagram of a method 1500, according to an example implementation of the disclosed technology. In block 1502, the method 1500 includes releasing from a stowed position, and by a hold down and release mechanism (HDRM), a first constrained portion of a plurality of solar panels. In block 1504, the method 1500 includes rotating the released portion of the plurality of solar panels to a first predetermined angle with respect to a first major side of a satellite body while maintaining a first stacked configuration. In block 1506, the method 1500 includes releasing, at the first predetermined angle, and by a first cam and a first stop mechanism, a second constrained end of a middle and outermost panel of the plurality of solar panels. In block 1508, the method 1500 includes rotating the released portion of the middle and outermost panel to a second predetermined angle while maintaining a second stacked configuration of the middle panel and the outermost panel. In block 1510, the method 1500 includes releasing, at the second predetermined angle, and by a second cam and a second stop mechanism, a third constrained end of the outermost panel.

Certain example implementations can include deploying, from a stowed position against a first major side of a satellite body, a plurality of solar panels having a deployable innermost, middle, and outermost panel, wherein the deployable outermost panel of the plurality of solar panels is disposed in a first stacked configuration between the deployable innermost panel and the deployable middle panel during the stowed position, wherein the plurality of solar panels are configured to be rotatably attached to one another therebetween by corresponding first-type hinge mechanisms, wherein the deployable innermost panel of the plurality of solar panels is configured to attach to the satellite body at a first edge region by one or more second-type hinge mechanisms, and wherein a hold down and release mechanism (HDRM) disposed at a second edge region of the satellite body is configured to constrain and selectively release the plurality of solar panels from the stowed position, the deploying including:

In accordance with an example implementation of the disclosed technology, the deployable innermost panel is an outermost panel in the stowed position.

In certain example implementations, the deploying results in a linear solar array comprising the deployable innermost, middle, and outermost panel.

In certain example implementations, the axis of the linear array is disposed about 135 degrees from respective faces of the first major side and a second major side of the satellite body.

According to an example implementation of the disclosed technology, the first-type hinge mechanism is characterized by a rotation angle range of about 0 degrees when stowed to about 180 degrees when deployed.

In certain example implementations, the second-type hinge mechanism is characterized by a rotation angle range of about 0 when stowed to about 135 degrees when deployed.

In certain example implementations, the HDRM is disposed at a fourth edge region of the satellite body, and a first combined rotatable edge of the plurality of solar panels in the stowed position is disposed opposite the second-type hinge mechanism.

According to an example implementation of the disclosed technology, the second-type hinge mechanism constrains the deployed linear array by a hinge spring and a hinge stop.

In certain example implementations, at least one of the plurality of solar panels is configured with substantially the same width as a corresponding width of the first major side of the satellite body.

In certain example implementations, at least one panel of the plurality of solar panels includes solar cells on back and front sides.

According to an example implementation of the disclosed technology, the first stop mechanism is configured to engage with the first cam to control a deployment sequence of the plurality of solar panels.

According to an example implementation of the disclosed technology, the second cam and a second stop are configured to engage during rotation to prevent the unfolding of the deployable outermost panel until the deployable middle panel has rotated beyond the second predetermined angle.

Certain example implementations of the disclosed technology can include installing a fixed solar panel on one or more of a second major side and a fourth major side of the satellite body.

In certain example implementations, the rotating is performed by stored force of a hinge spring of the one or more of the first-type and second-type hinge mechanisms.

Figure 16:
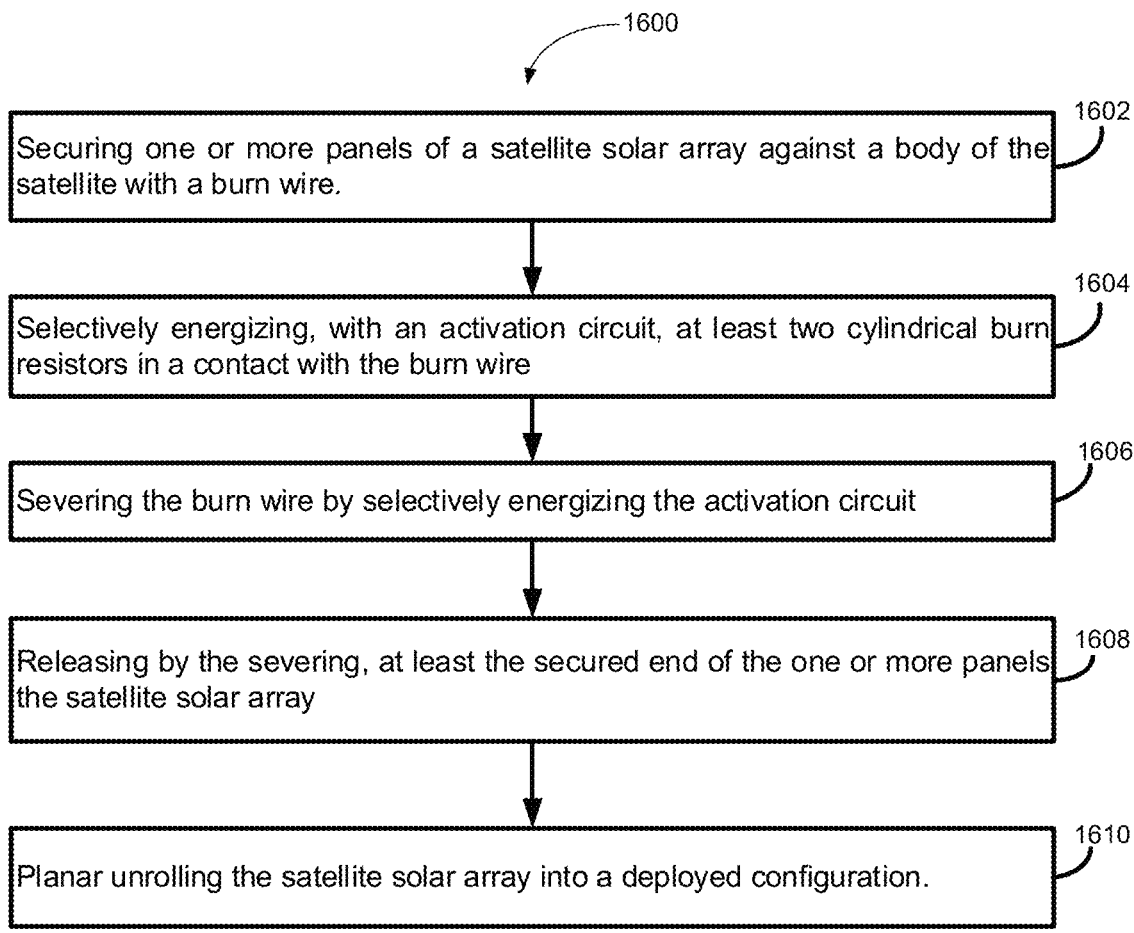
FIG. 16 is a flow diagram of a method 1600, according to an example implementation of the disclosed technology.

FIG. 16 is flow diagram of a method 1600, according to an example implementation of the disclosed technology. In block 1602, the method 1600 includes securing one or more panels of a satellite solar array against a body of the satellite with a burn wire. In block 1604, the method 1600 includes selectively energizing, with an activation circuit, at least two cylindrical burn resistors in a contact with the burn wire. In block 1606, the method 1600 includes severing the burn wire by selectively energizing the activation circuit. In block 1608, the method 1600 includes releasing by the severing, at least the secured end of the one or more panels the satellite solar array. In block 1610, the method 1600 includes planar unrolling the satellite solar array into a deployed configuration.

Certain example implementations of the disclosed technology can include retaining, by restraining hooks, the burn wire against the at least two cylindrical burn resistors.

According to an example implementation of the disclosed technology, the selectively energizing directs current through the at least two cylindrical burn resistors to sever the burn wire.

Certain example implementations of the disclosed technology include launching the satellite into orbit.

Certain example implementations of the disclosed technology include thermally isolating the two or more cylindrical burn resistors by a circuit board to contain least a portion of heat generated by the at least two cylindrical burn resistors.

Certain example implementations of the disclosed technology can include securing the circuit board to at least one panel of the satellite solar array.

Certain example implementations of the disclosed technology can include mechanically coupling the two cylindrical burn resistors to the circuit board.

In accordance with an example implementation of the disclosed technology, the burn wire may be a monofilament.

Certain implementations of the disclosed technology may include a system that includes a satellite body. The satellite body may define: first, second, third, and fourth major sides; with first, second, third and fourth edge regions disposed between the corresponding first and second, second and third, third and fourth, and fourth and first major sides. The system includes a first solar array having a plurality of panels attached to one another therebetween by corresponding first-type hinge mechanisms. A first panel of the plurality of panels is attached to the satellite body at the first edge region by one or more second-type hinge mechanisms, and at least the first panel of the plurality of panels is releasably constrained by a hold down and release mechanism (HDRM). The first solar array is configured to be foldable (planar rollable) into a stowed configuration, and unfoldable (planar unrollable) into a deployed configuration.

In certain example implementations, the first-type hinge mechanism is characterized by a rotation angle range of about 0 when stowed to about 180 degrees when deployed.

In certain example implementations, the second-type hinge mechanism is characterized by a rotation angle range of about 0 when stowed to about 135 degrees when deployed.

According to an example implementation of the disclosed technology, the HDRM may be configured to constrain the plurality of panels of the first solar array against the first major side while in the stowed configuration, and release a first combined rotatable edge of the stowed and rolled-up plurality of panels during deployment.

In certain example implementations, the HDRM may be disposed at the fourth edge region, and wherein the first combined rotatable edge of the stowed and rolled-up plurality of panels is disposed opposite the second-type hinge mechanism.

Certain example implementations of the disclosed technology may include a second solar array having a second plurality of panels attached to one another therebetween by corresponding first-type hinge mechanisms. In an example implementation, the first panel of the second plurality of panels may be attached to the satellite body at the third edge region by one or more second-type hinge mechanisms. In certain example implementations, the second solar array may be configured to be foldable into a stowed configuration, and unrollable into a deployed linear configuration.

Certain example implementations of the disclosed technology may include a second HDRM configured to constrain the second plurality of panels of the second solar array against the third major side while in the stowed configuration, and release a second combined rotatable edge of the stowed and rolled-up second plurality of panels for deployment.

According to an example implementation of the disclosed technology, the second HDRM and the second combined rotatable edge may be disposed at the second edge region.

According to an example implementation of the disclosed technology, and while in the stowed configuration, the first panel of the plurality of panels of the first solar array may be exposed to an outer portion of the system, a second panel of the plurality of panels of the first solar array may be disposed directly adjacent to the first major side; and a third panel of the plurality of panels of the first solar array may be disposed between the first panel and the second panel.

According to an example implementation of the disclosed technology, and while in the deployed configuration, the plurality of panels may be configured as a linear array.

In certain example implementations, an axis of the deployed linear array may be disposed about 135 degrees from respective faces of the first major side and the second major side.

In certain example implementations, the second-type hinge mechanism may constrain the deployed linear array by a hinge spring and a hinge stop.

According to an example implementation of the disclosed technology, at least one of the plurality of panels may be configured with substantially the same width as a corresponding width of the first major side.

In certain example implementations, at least one panel of the plurality of panels may include solar cells on back and front sides.

In certain example implementations, the first plurality of panels can include two or more solar cell panels.

Certain example implementations of the disclosed technology can include a stop mechanism adjacent the first edge and configured engage with a cam to control a deployment sequence of the plurality of panels.

Certain example implementations of the disclosed technology can include a second stage mechanism including a second cam and a second stop configured to engage during rotation to prevent the unfolding of an outermost panel of the plurality of panels until a middle panel of the plurality of panels has rotated enough beyond a predetermined angle.

According to an example implementation of the disclosed technology, one or more of the second major side and fourth major side of the satellite body may be configured with a fixed first solar panel.

In certain example implementations, at least one outermost panel of the plurality of panels is disposed and stacked between an innermost panel and a middle panel of the plurality of panels during stowing.

Certain example implementations of the disclosed technology can include one or more circuits for selectively actuating the HDRM for deployment of the plurality of panels.

Certain implementations of the disclosed technology may include hinge assembly configured to rotatingly join an inboard panel with an outboard panel of a deployable satellite solar array. The hinge assembly includes: a first rotor having a pin portion, a rotor endstop portion, and a first rotor body portion. The first rotor body portion is configured to attach to the outboard panel. The hinge assembly includes a first bushing having an inner surface configured to rotatingly engage with an outer surface of the pin portion of the first rotor. The hinge assembly includes a stator having a first bore, a stator endstop portion, a stator body portion, and a second bore. An inner surface of the first bore is configured to engage with an outer surface of the first bushing, and the stator endstop portion is configured to restrict a relative rotation between the inboard and outboard panel when engaged with the rotor endstop portion. The stator body portion is configured to attach to the inboard panel. The hinge assembly includes a second bushing having an outer surface configured to engage with an inner surface of the second bore of the stator. The hinge assembly includes second rotor having a second rotor pin portion, a spring retention portion and a second rotor body portion. An outer surface of the second rotor pin portion is configured to rotatingly engage with an inner surface of the second bushing, and the second rotor body portion is configured to attach to the outboard panel. The hinge assembly includes a spring having a coiled portion, a first spring end, and a second spring end. The coiled portion is configured to surround the spring retention portion of the second rotor, the first spring end is configured to engage with the stator, and the second spring end is configured to engage with the second rotor.

According to an example implementation of the disclosed technology, the outboard panel may be configured to engage with the bushing to act as a rotating pin with rotational range constrained by the mechanical end stop.

In certain example implementations, the inboard panel may include a body portion of the satellite.

In certain example implementations, the first and second bushings may be shaped as hollow cylinders.

In certain example implementations, the stator can include a first recess for constraining the first spring leg. According to an example implementation of the disclosed technology, the first recess may constrain the first spring leg between the stator and the inboard panel.

In certain example implementations, the second rotor can include a second recess for constraining the second spring leg.

In accordance with certain example implementations of the disclosed technology, the second recess may constrain the second spring leg between the second rotor and the outboard panel.

According to an example implementation of the disclosed technology, the second bushing may include a flange configured to rotatingly engage with a portion of the spring.

In certain example implementations, the inner surface of the first bore may be configured to rotatingly engage with the outer surface of the first bushing.

In certain example implementations, the second bushing outer surface is configured to rotatingly engage with the inner surface of the second bore of the stator.

According to an example implementation of the disclosed technology, the spring may be configured to provide stored energy and actuation force to rotate the outboard panel with respect to the inboard panel.

In certain example implementations, spring may be configured to retain a relative rotation of the outboard panel with respect to the inboard panel in a deployed position when the rotor endstop portion engages with the stator endstop portion.

According to an example implementation of the disclosed technology, the rotor endstop portion may be configured to allow a rotation range between the inboard panel and the outboard panel of about 0 to about 135 degrees before engaging with the stator endstop portion.

In certain example implementations, the inboard panel can include a portion of the satellite body.

In accordance with certain example implementations of the disclosed technology, the rotor endstop portion may be configured to allow a rotation range between the inboard panel and the outboard panel of about 0 to about 180 degrees before engaging with the stator endstop portion.

In certain example implementations, the hinge assembly may be configured to fit within a defined volume along respective edges of the inboard and outboard panels without intruding onto a volume defined by the associated panels or adjacent hinges.

In certain example implementations, low-profile screws may be used to fasten the stator to the inboard panel.

In certain example implementations, at least one of the first and second bushings may be configured to impart rotational resistance to the respective first and second rotors.

Certain implementations of the disclosed technology may include hold down and release mechanism (HDRM) configured to secure and selectively release one or more panels of a deployable satellite solar array. The HDRM can include: a circuit board electrically coupled to an activation circuit; at least two cylindrical burn resistors electrically coupled to the circuit board; a burn wire (such as monofilament) in contact with the at least two cylindrical burn resistors; and two or more restraining hooks configured to retain the burn wire against the at least two cylindrical burn resistors. The activation circuit is configured to selectively direct current through the at least two cylindrical burn resistors to sever the burn wire.

In certain example implementations, the circuit board may be mechanically secured to at least one panel of the deployable satellite solar array. According to an example implementation of the disclosed technology, the circuit board may be configured as a thermal isolator to prevent at least a portion of heat generated by the at least two cylindrical burn resistors from spreading to the at least one panel of the deployable satellite solar array. In certain example implementations of the disclosed technology, the circuit board may be mechanically secured to at least one panel of the deployable satellite solar array. In certain example implementations, the circuit board may be mechanically secured to a body portion of the satellite.

In certain example implementations, the at least two cylindrical burn resistors may be mechanically coupled to the circuit board.

According to an example implementation of the disclosed technology, the restraining hooks may be mounted to the circuit board.

In certain example implementations, the burn wire may be secured to a body portion of the satellite by at least one fastener. In certain example implementations, one end of the burn wire may be secured to another end of the burn wire.

Certain example implementations of the disclosed technology can include a stow detect switch configured to provide indications of the held and deployed state of the deployable satellite solar array.

In accordance with certain example implementations of the disclosed technology, cylindrical burn resistors 1102 may be rated at approximately 15 ohms. In certain example implementations, the burn resistors 1102 may be selected, as appropriate, to range in resistance from about 5 ohms to about 20 ohms, depending on the excitation voltage and current capability applied during deployment. In certain example implementations of the disclosed technology, the burn resistors 1102 may be cylindrical thin-film MELF resistors. In certain example implementations, the burn resistors 1102 may be rated at 250 mW. In certain example implementations, the burn resistors 1102 may be selected, as appropriate, from a power rating ranging from about 200 mW to about 500 mW. In certain example implementations, the burn resistors 1102 may be in the form of a 0204 package.

In accordance with certain example implementations of the disclosed technology, activation circuit is configured to selectively provide 8 or more volts to one of the at least two cylindrical burn resistors 1102. In certain example implementations, the activation circuit may be configured to selectively provide a voltage ranging from approximately 4 volts to approximately 12 volts to one of the at least two cylindrical resistors 1102.

In certain example implementations, a hinge spring provides a force to deploy the one or more panels when the burn wire is severed.

In the preceding description, numerous specific details have been set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "various implementations," etc., indicate that the implementation(s) of the disclosed technology so described may include a feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a sequence, either temporally, spatially, in ranking, or in any other manner.

While certain implementations of the disclosed technology have been described regarding what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a satellite body defining:
      first, second, third, and fourth major sides;
      first, second, third and fourth edge regions disposed between the corresponding first and second, second and third, third and fourth, and fourth and first major sides;
   a first solar array comprising a plurality of panels including an innermost panel, a middle panel, and at least one outermost panel, wherein the middle panel is joined with the innermost panel and the outermost panel by first-type hinge mechanisms each having a first rotation axis, wherein the innermost panel is attached to the satellite body by one or more second-type hinge mechanisms each having a second rotation axis substantially parallel to the first rotation axis, and wherein at least the innermost panel is releasably constrained; and
   wherein the first solar array is configured to be foldable into a stowed configuration, and planar unrollable into a deployed configuration,
   wherein when the first solar array is in the deployed configuration, the innermost panel is immediately adjacent to the satellite body, the middle panel is disposed between the innermost panel and the outermost panel, and the outermost panel is disposed outmost from the satellite body,
   wherein during deployment,
      the innermost panel first rotates away from the satellite body, while the innermost panel, the middle panel and the outermost panel are held together,
      the middle panel and the outermost panel then rotate away from the innermost panel, while the middle panel and the outermost panel are held together, and
      the outermost panel then rotates away from the middle panel,
   wherein while in the stowed configuration:
      the middle panel is placed against the satellite body,
      the outermost panel is disposed between the innermost panel and the middle panel, and
      the innermost panel surrounds and constrains the middle panel and the outermost panel against the satellite body.

2. The system of claim 1, wherein the first-type hinge mechanisms are configured to rotate between 0 when stowed and 180 degrees when deployed.

3. The system of claim 1, wherein the one or more second-type hinge mechanisms are configured to rotate between 0 when stowed and 135 degrees when deployed.

4. The system of claim 1, wherein
   the plurality of panels of the first solar array are constrained against the first major side while in the stowed configuration; and
   a first combined rotatable edge of the stowed and planar rolled-up plurality of panels is released during deployment.

5. The system of claim 4, wherein the first combined rotatable edge of the stowed and planar rolled-up plurality of panels is disposed opposite the one or more second-type hinge mechanisms.

6. The system of claim 4, further comprising one or more circuits for deployment of the plurality of panels.

7. The system of claim 1, further comprising a second solar array comprising a second plurality of panels attached to one another therebetween by corresponding first-type hinge mechanisms, wherein a first panel of the second plurality of panels is attached to the satellite body at the third edge region by one or more second-type hinge mechanisms; and
   wherein the second solar array is configured to be foldable into a stowed configuration, and planar unrollable into a deployed linear configuration.

8. The system of claim 7, wherein
   the second plurality of panels of the second solar array are constrained against the third major side while in the stowed configuration; and
   a second combined rotatable edge of the stowed and planar rolled-up second plurality of panels is released for deployment.

9. The system of claim 8, wherein the second combined rotatable edge are disposed at the second edge region.

10. The system of claim 1, wherein while in the deployed configuration, the plurality of panels are configured as a deployed linear array.

11. The system of claim 10, wherein an axis of the deployed linear array is disposed 135 degrees from respective faces of the first major side and the second major side.

12. The system of claim 1, wherein the one or more second-type hinge mechanisms constrain the deployed linear array by a hinge spring and a hinge stop.

13. The system of claim 1 wherein at least one of the plurality of panels is configured with substantially the same width as a corresponding width of the first major side.

14. The system of claim 1, wherein at least one panel of the plurality of panels include solar cells on back and front sides.

15. The system of claim 1, further comprising a stop mechanism adjacent the first edge and configured to engage with a cam to control a deployment sequence of the plurality of panels.

16. The system of claim 1, further comprising a second stage mechanism including a second cam and a second stop configured to engage during rotation to prevent unfolding of the outermost panel of the plurality of panels until the middle panel of the plurality of panels has rotated enough beyond a predetermined angle.

17. The system of claim 1, wherein one or more of the second major side and fourth major side of the satellite body is configured with a fixed first solar panel.

18. The system of claim 1, wherein the at least one outermost panel of the plurality of panels is disposed and stacked between the innermost panel and the middle panel of the plurality of panels during stowing.

* * * * *